(12) United States Patent
Kim et al.

(10) Patent No.: US 10,225,061 B2
(45) Date of Patent: Mar. 5, 2019

(54) METHOD AND APPARATUS FOR RECEIVING FRAME

(71) Applicant: LG ELECTRONICS INC., Seoul (KR)

(72) Inventors: Suhwook Kim, Seoul (KR); Kiseon Ryu, Seoul (KR); Jinyoung Chun, Seoul (KR); Wookbong Lee, Seoul (KR); Jinsoo Choi, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 45 days.

(21) Appl. No.: 15/319,477

(22) PCT Filed: Jan. 28, 2015

(86) PCT No.: PCT/KR2015/000899
§ 371 (c)(1),
(2) Date: Dec. 16, 2016

(87) PCT Pub. No.: WO2015/194732
PCT Pub. Date: Dec. 23, 2015

(65) Prior Publication Data
US 2017/0149547 A1    May 25, 2017

Related U.S. Application Data

(60) Provisional application No. 62/036,602, filed on Aug. 12, 2014, provisional application No. 62/016,607, (Continued)

(51) Int. Cl.
*H04B 7/26* (2006.01)
*H04L 1/18* (2006.01)
(Continued)

(52) U.S. Cl.
CPC ............. *H04L 5/0055* (2013.01); *H04B 7/26* (2013.01); *H04B 7/2678* (2013.01); *H04L 1/18* (2013.01);
(Continued)

(58) Field of Classification Search
CPC .......................... H04L 5/0055; H04W 72/0493
(Continued)

(56) References Cited

U.S. PATENT DOCUMENTS

2006/0034274 A1* 2/2006 Kakani ................. H04L 1/1829
370/389
2007/0011554 A1* 1/2007 Trainin ................. H04L 1/1621
714/749
(Continued)

*Primary Examiner* — Peter G Solinsky
(74) *Attorney, Agent, or Firm* — Birch, Stewart, Kolasch & Birch, LLP

(57) ABSTRACT

Disclosed are a method and an apparatus for receiving a frame. A method for receiving a frame in a wireless LAN comprises the steps of: an AP transmitting, to a plurality of STAs, a downlink PPDU including downlink data for each of the plurality of STAs, through a plurality of channels; and the AP receiving, from each of the plurality of STAs, a plurality of block ACK frames transmitted based on a block ACK transmission control field, wherein the downlink PPDU includes the block ACK transmission control field, and wherein each of the plurality of block ACK frames may include ACK information related to downlink data.

10 Claims, 16 Drawing Sheets

Related U.S. Application Data filed on Jun. 24, 2014, provisional application No. 62/014,655, filed on Jun. 19, 2014.

(51) Int. Cl.
   *H04L 5/00*    (2006.01)
   *H04L 27/26*   (2006.01)
   *H04W 72/04*   (2009.01)
   *H04W 84/12*   (2009.01)
   *H04W 88/08*   (2009.01)

(52) U.S. Cl.
   CPC ......... *H04L 27/26* (2013.01); *H04W 72/0493* (2013.01); *H04W 84/12* (2013.01); *H04W 88/08* (2013.01)

(58) Field of Classification Search
   USPC .......................................................... 370/329
   See application file for complete search history.

(56) References Cited

U.S. PATENT DOCUMENTS

| | | | |
|---|---|---|---|
| 2007/0097927 A1* | 5/2007 | Gorokhov | H04B 1/7103 370/335 |
| 2007/0153760 A1* | 7/2007 | Shapira | H04B 7/2681 370/350 |
| 2010/0246600 A1* | 9/2010 | Das | H04W 28/06 370/465 |
| 2010/0316150 A1 | 12/2010 | Amini et al. | |
| 2011/0261742 A1 | 10/2011 | Wentink | |
| 2012/0163246 A1* | 6/2012 | Wang | H04L 1/1832 370/277 |
| 2012/0213308 A1 | 8/2012 | Merlin et al. | |
| 2013/0142099 A1* | 6/2013 | Shirakata | H04W 52/028 370/311 |
| 2013/0176939 A1* | 7/2013 | Trainin | H04L 1/1614 370/328 |
| 2013/0229996 A1* | 9/2013 | Wang | H04W 72/0413 370/329 |
| 2013/0286959 A1 | 10/2013 | Lou et al. | |
| 2013/0301569 A1* | 11/2013 | Wang | H04L 5/0055 370/329 |
| 2014/0341234 A1* | 11/2014 | Asterjadhi | H04L 69/324 370/474 |
| 2015/0131517 A1* | 5/2015 | Chu | H04L 5/0007 370/312 |
| 2015/0139156 A1* | 5/2015 | Thakur | H04W 76/023 370/329 |
| 2015/0146648 A1* | 5/2015 | Viger | H04L 1/1621 370/329 |
| 2015/0146700 A1* | 5/2015 | Wentink | H04W 74/0816 370/336 |
| 2015/0223222 A1* | 8/2015 | Irie | H04B 7/086 370/329 |
| 2015/0282005 A1* | 10/2015 | Du | H04L 45/245 370/394 |
| 2016/0043946 A1* | 2/2016 | Merlin | H04L 45/74 370/392 |
| 2017/0019818 A1* | 1/2017 | Xing | H04B 7/00 |
| 2017/0078003 A1* | 3/2017 | Ghosh | H04W 74/04 |
| 2017/0105226 A1* | 4/2017 | Irie | H04W 72/085 |
| 2017/0134975 A1* | 5/2017 | Huang | H04W 24/08 |
| 2017/0155490 A1* | 6/2017 | Wang | H04L 5/0055 |
| 2017/0231009 A1* | 8/2017 | Wang | H04W 74/0816 |
| 2018/0084566 A1* | 3/2018 | Wang | H04W 72/0413 |

\* cited by examiner

FIG. 1
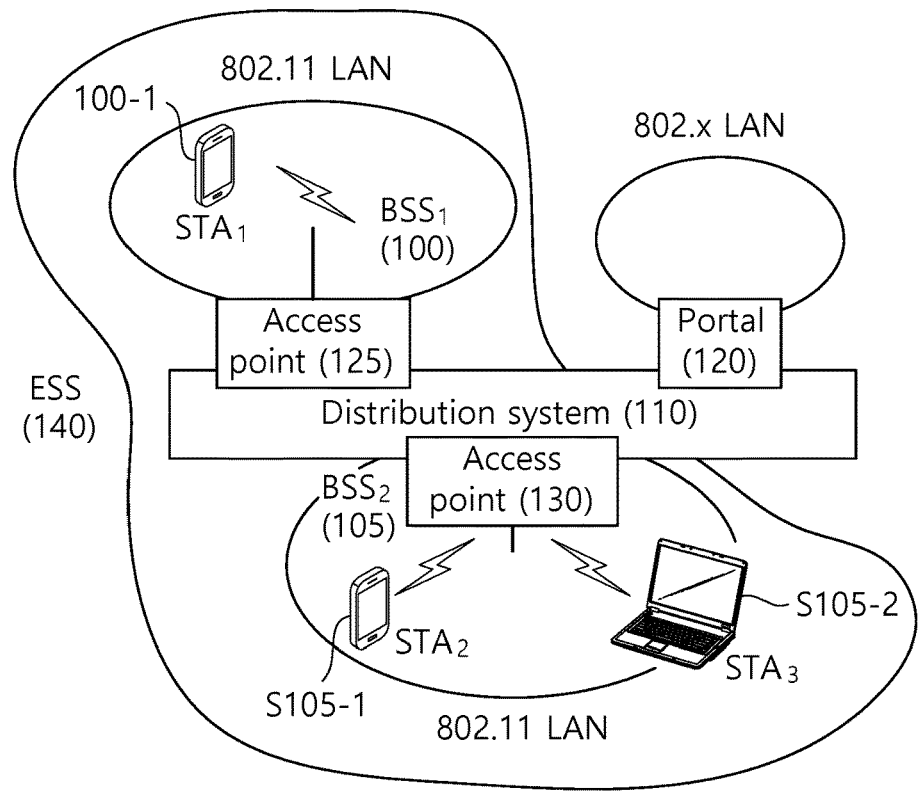
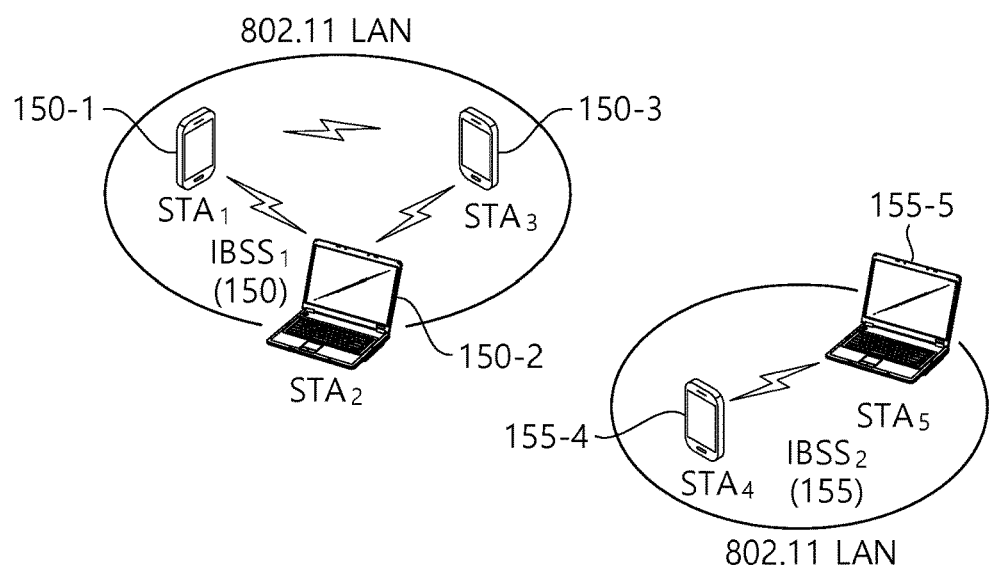

FIG. 5
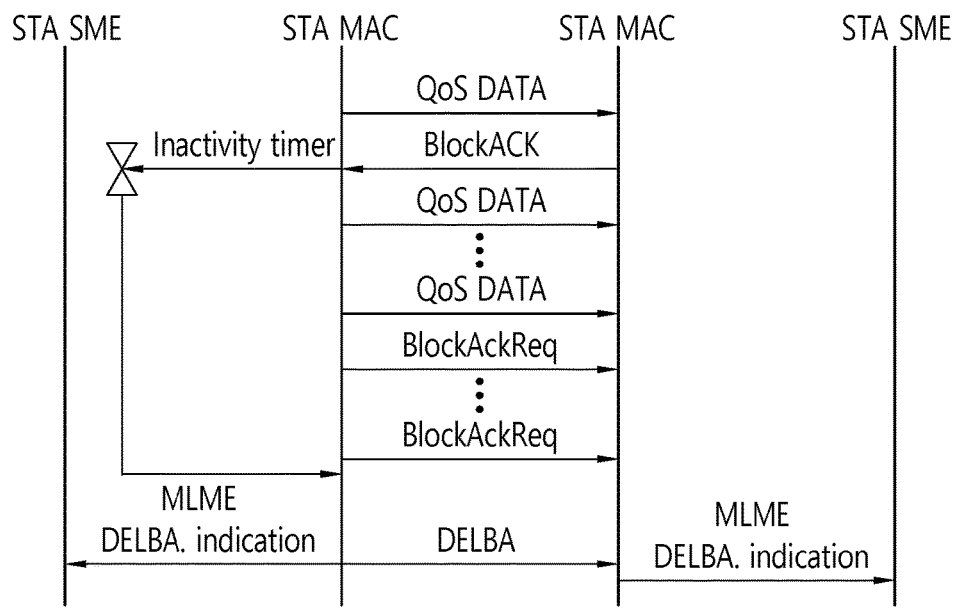
(a) Transmitting end
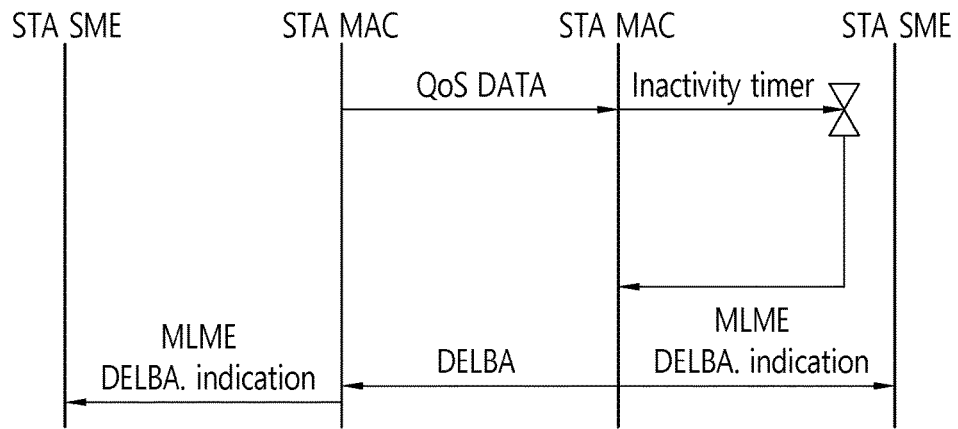
(b) Receiving end

METHOD AND APPARATUS FOR RECEIVING FRAME

CROSS REFERENCE TO RELATED APPLICATIONS

This application is the National Stage filing under 35 U.S.C. 371 of International Application No. PCT/KR2015/000899, filed on Jan. 28, 2015, which claims priority under 35 U.S.C. § 119(e) to U.S. Provisional Application No. 62/014,655, filed on Jun. 19, 2014, U.S. Provisional Application No. 62/016,607, filed on Jun. 24, 2014, and U.S. Provisional Application No. 62/036,602, filed on Aug. 12, 2014, the contents of which are all hereby incorporated by reference herein in their entirety.

BACKGROUND OF THE INVENTION

Field of the Invention

The present invention relates to wireless communication and, most particularly, to a method and apparatus for receiving a frame.

Related Art

Data aggregation transmission, which corresponds to one of the typical (or representative) medium access control (MAC) functions of the IEEE 802.11n, configures multiple data frames having the same destination address to a single frame, thereby being capable of enhancing transmission throughput by reducing the size of communication control information. In the IEEE 802.11n environment, as the length of a data frame becomes shorter, the size of the control information becomes comparatively larger, thereby reducing the system throughput. Conversely, the data aggregation transmission method may prevent the decrease in the system throughput, which is caused by a relative decrease in the control information size as compared to the data frame, and, by transmitting individual acknowledgements (ACKs) for each reception frame as a single block ACK via aggregation transmission, the aggregation transmission method may enhance efficiency in channel usage.

Since the data aggregation transmission of the IEEE 802.11n is designed based on the data aggregation transmission of the IEEE 802.11e, the legacy aggregation transmission may be used without any modification, thereby providing network compatibility.

SUMMARY OF THE INVENTION

Technical Objects

An object of the present invention is to provide a method for receiving a frame.

Another object of the present invention is to provide an apparatus for receiving a frame Technical Solutions In order to achieve the above-described technical object of the present invention, according to an aspect of the present invention, a method for receiving a frame in a wireless LAN may include the steps of transmitting by an access point (AP) a downlink physical layer protocol data (PPDU) including downlink data corresponding to each of a plurality of stations (STAs) to the plurality of STAs through a plurality of channels, wherein the downlink PPDU includes a block acknowledgement (ACK) transmission control field, and receiving by the AP each of a plurality of block ACK frames being transmitted based on the block ACK transmission control field from each of the plurality of STAs, wherein each of the plurality of block ACK frames includes ACK information corresponding to the downlink data, herein, the block ACK transmission control field may include a transmission resource field and an ACK policy field, the transmission resource field may include information on a channel for transmitting each of the plurality of block ACK frames by each of the plurality of STAs, among the plurality of channels, and the ACK policy field may include information on whether each of the plurality of block ACK frames are to be transmitted based on immediate block ACK transmission or whether each of the plurality of block ACK frames are to be transmitted based on delayed block ACK transmission by each of the plurality of STAs.

In order to achieve the above-described technical object of the present invention, according to another aspect of the present invention, an access point (AP) transmitting a frame in a wireless LAN may include a radio frequency (RF) unit being configured to transmit or receive radio signals, and a processor being operatively connected to the RF unit, wherein the processor may be configured to transmit a downlink physical layer protocol data (PPDU) including downlink data corresponding to each of a plurality of stations (STAs) to the plurality of STAs through a plurality of channels, and to receive each of a plurality of block ACK frames being transmitted based on the block ACK transmission control field from each of the plurality of STAs, herein, each of the plurality of block ACK frames may include ACK information corresponding to the downlink data, the downlink PPDU may include the block acknowledgement (ACK) transmission control field, the block ACK transmission control field may include a transmission resource field and an ACK policy field, the transmission resource field may include information on a channel for transmitting each of the plurality of block ACK frames by each of the plurality of STAs, among the plurality of channels, and the ACK policy field may include information on whether each of the plurality of block ACK frames are to be transmitted based on immediate block ACK transmission or whether each of the plurality of block ACK frames are to be transmitted based on delayed block ACK transmission by each of the plurality of STAs.

EFFECTS OF THE INVENTION

A transmission resource allocation method of a block ACK frame being transmitted as a response to downlink data being transmitted based on a downlink multi-user (DL MU) transmission of an access point (AP) is disclosed herein. Efficiency in radio resources of a wireless LAN may be enhanced based on such transmission resource allocation method of the block ACK frame.

BRIEF DESCRIPTION OF THE DRAWINGS

FIG. 1 is a conceptual diagram showing the structure of a wireless local area network (WLAN).

FIG. 5 illustrates block ACK operations.

DESCRIPTION OF EXEMPLARY EMBODIMENTS

Figure 2:
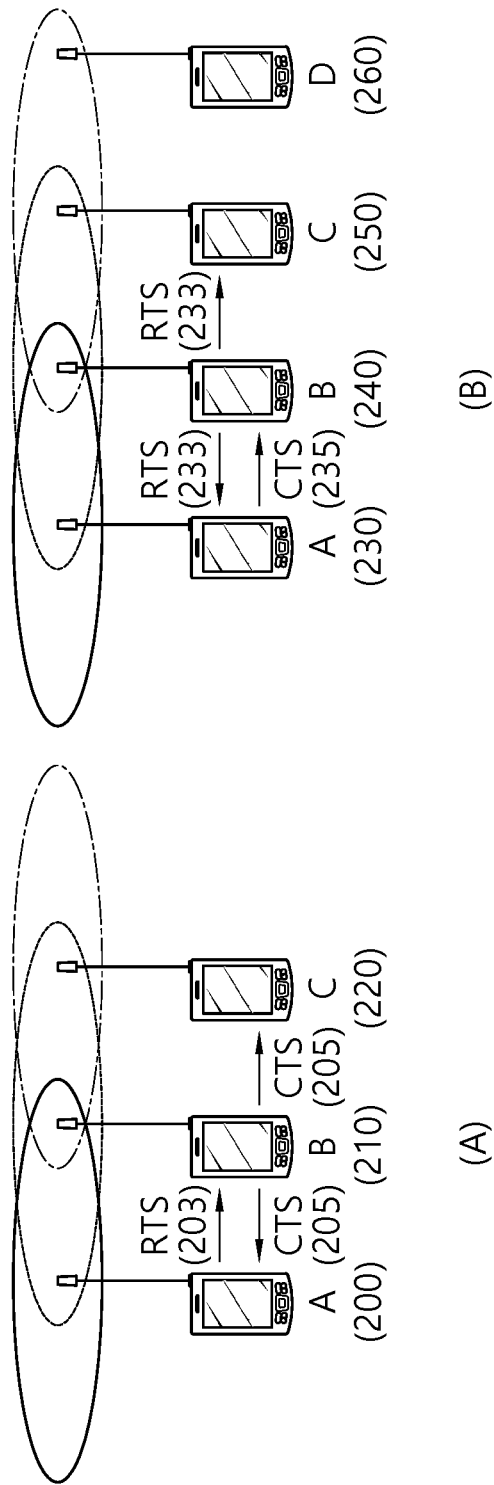
FIG. 2 is a conceptual diagram showing a method of using a Request to Send (RTS) frame and a Clear to Send (CTS) frame in order to resolve a hidden node issue and an exposed node issue.

FIG. 1 is a conceptual diagram showing the structure of a wireless local area network (WLAN).

An upper portion of FIG. 1 shows the structure of the IEEE (institute of electrical and electronic engineers) 802.11 infrastructure network.

Referring to the upper portion of FIG. 1, the WLAN system may include one or more basic service sets (BSSs, 100 and 105). The BSS 100 or 105 is a set of an AP such as AP (access point) 125 and an STA such as STA1(station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 230 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper portion of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower portion of FIG. 1 is a concept view illustrating an independent BSS.

Referring to the lower portion of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-1, and 155-2 are managed in a distributed manner. In the IBSS, all of the STAs 150-1, 150-2, 150-3, 155-1, and 155-2 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

An access point (AP), which operates in a wireless local area network (WLAN) system, may transmit data to each of a plurality of stations (STAs) through the same time resource. If the transmission from the AP to the STA is referred to as a downlink transmission, the transmission of such AP to a plurality of STAs may be expressed by using the term downlink multi-user transmission (DL MU transmission) (or downlink multiple user transmission).

FIG. 2 is a conceptual diagram showing a method of using a Request to Send (RTS) frame and a Clear to Send (CTS) frame in order to resolve a hidden node issue and an exposed node issue.

Referring to FIG. 2, a short signaling frame, such as an RTS frame and a CTS frame, may be used to solve the hidden node issue and the exposed node issue. Neighboring STAs may recognize based on the RTS frame and the CTS frame whether data transmission and reception is performed between two STAs.

(A) of FIG. 2 illustrates a method of transmitting an RTS frame203 and a CTS frame205 in order to solve the hidden node issue.

It may be assumed that both STA A 200 and STA C 220 intend to transmit data frames to STA B 210. STA A 200 transmits an RTS frame203 to STA B 210 before transmitting a data frame, and STA B 210 may transmit a CTS frame205 to STA A 200. STA C 220 overhears the CTS frame205 and recognizes that transmission of a frame is performed via a medium from STA A 200 to STA B 210. STA C 220 may set a network allocation vector (NAV) until STA A 200 finishes transmitting the data frame to STA B 210. Using such a method may prevent a collision between frames due to a hidden node.

(B) of FIG. 2 illustrates a method of transmitting an RTS frame233 and a CTS frame235 in order to solve the exposed node issue STA C 250 may determine whether a collision occurs if transmitting a frame to another STA D 260 based on monitoring of an RTS frame233 and a CTS frame235 between STA A 230 and STA B 240.

STA B 240 transmits the RTS frame233 to STA A 230, and STA A 230 may transmit the CTS frame235 to STA B 240. STA C 250 overhears only the RTS frame233 transmitted by STA B 240 and does not overhear the CTS frame235 transmitted by STA A 230. Thus, STA C 250 recognizes that STA A 230 is out of a carrier sensing range of STA C 250. Accordingly, STA C 250 may transmit data to STA D 260.

An RTS frame format and a CTS frame format are disclosed in 8.3.1.2 RTS frame format and 8.3.1.3 CTS frame format of IEEE P802.11-REVmcTM/D2.0, October 2013.

Figure 3:
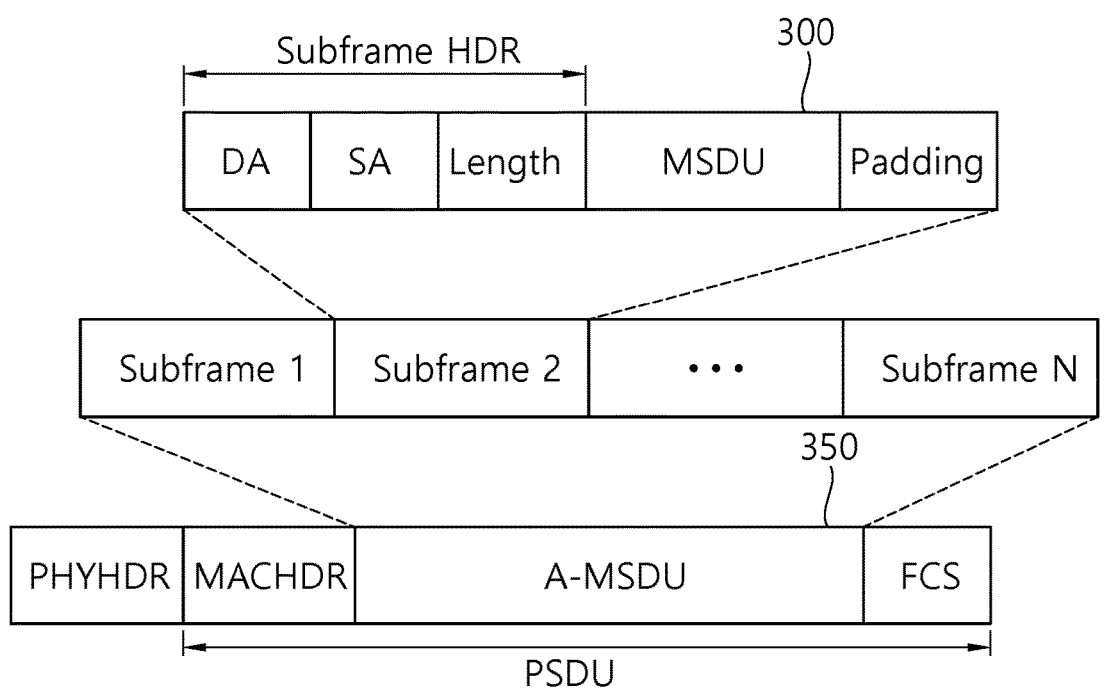
FIG. 3 is a conceptual diagram showing an A-MSDU.

FIG. 3 is a conceptual diagram showing an A-MSDU.

A method for performing aggregation of data frames in order to reduce MAC error overhead is defined in the IEEE 802.11n. A MAC service data unit (MSDU) 300, which is generated in an application layer in order to perform aggregation of the data frames, may be processed with aggregation in a higher layer of the MAC layer, thereby being generated as a single MSDU. The MSDU that is aggregated in the higher layer of the MAC layer may be defined by using the term aggregate-MSDU (A-MSDU) 350. The A-MSDU 350 may be generated based on an aggregation of multiple MSDUs 300 each having the same priority level and the receiver address (RA).

Each MSDU 300 may include a subframe header (subframe HDR), which is configured of a destination address (DA), a source address (SA), and a MSDU length. In order to configure the total length of the A-MSDU subframe to be equal to a predetermined multiple (a multiple of 4 octets), padding may be performed on the A-MSDU subframe. A plurality of A-MSDU subframes may be grouped so as to configure a single A-MSDU 350.

Unlike the single MSDU, fragmentation is not performed on the A-MSDU 350. Instead, the A-MSDU 350 may be configured as a single QoS data MAC protocol data unit (MPDU) and may then be transmitted. For example, the A-MSDU 350 may be transmitted only in case the HT capability of a management information base (MIB) field is TRUE, i.e., only in case of an HT STA, and, similarly, the A-MSDU 350 may be transmitted only to the HT STA. The HT STA has the capability of performing de-aggregation on the A-MSDU 350, and the HT STA verifies the presence or absence of an A-MSDU 350 in a QoS field of the MAC header of the received QoS data and may then perform de-aggregation.

In case the ACK policy of the QoS data MPDU of the HT STA is configured as a normal ACK, the A-MSDU 350 cannot be aggregated as the A-MPDU. Additionally, whether or not the A-MSDU 350 can be aggregated to an A-MPDU may vary in accordance with whether or not a block acknowledgement (ACK) agreement per traffic identifier (TID) has been established. Additionally, even in case a block ACK agreement is established for the TID, in case an A-MSDU block ACK support availability indicator of an add block acknowledgement (ADDBA) response frame of the receiving end in accordance with an add block acknowledgement (ADDBA) request frame indicates that the block ACK is not supported, the A-MSDU cannot be included in the A-MPDU.

Figure 4:
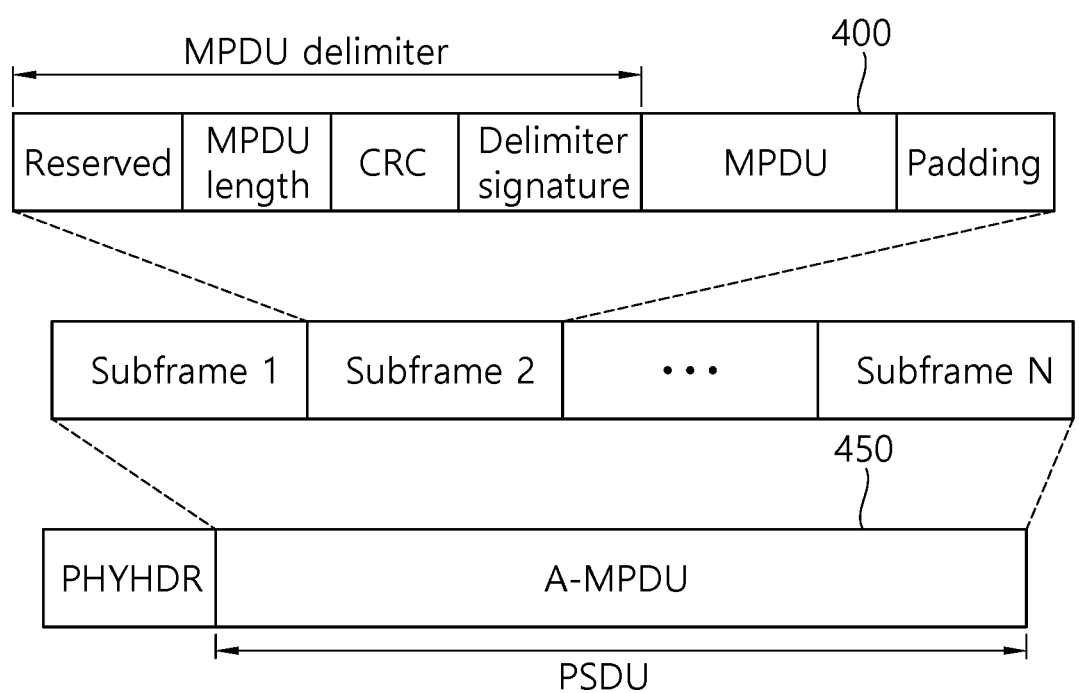
FIG. 4 is a conceptual diagram showing an A-MPDU.

FIG. 4 is a conceptual diagram showing an A-MPDU.

Referring to FIG. 4, a single A-MPDU 450 may be configured by grouping a plurality of MPDUs 400 each having the same receiver address (RA) and TID and ACK policy in the lower portion of the MAC layer.

An A-MPDU 450 is configured of one or more A-MPDU subframes, and each A-MPDU subframe may include a MPDU delimeter and a MPDU 400. The MPDU delimeter may be used for determining whether or not an error occurs in the A-MPDU subframes configuring the A-MPDU 450. The plurality of A-MPDU subframes may configure a single A-MPDU 450.

Whether or not the A-MPDU 450 is successfully received may be indicated based on the block ACK. The A-MPDU 450 may be configured only for the TID having an HT-immediate BA agreement established therein, and a value of a duration/ID field of the MPDU 400 configuring the A-MPDU 450 may be set to have the same value.

FIG. 5 illustrates block ACK operations.

A block ACK mechanism was adopted in order to transmit at once response frames including ACK information related to multiple frames, which are transmitted during a TXOP period. In case the block ACK mechanism is used, just as the A-MSDU or A-MPDU, the efficiency of the MAC layer, which is caused by a decrease in the overhead, may be enhanced.

Referring to FIG. 5, the block ACK transmission for an A-MPDU of one TID may be performed based on a setup procedure, a transmission procedure, and a tear down procedure. The setup procedure corresponds to a procedure for requesting and responding to a block ACK session.

During the transmission procedure, an STA of the transmitting end (hereinafter referred to as the transmitting end) may transmit consecutive data to an STA of the receiving end (hereinafter referred to as the receiving end), and the STA of the receiving end may transmit an aggregated response to the consecutive data to the STA of the transmitting end.

The tear down procedure may tear down the configured block ACK session.

More specifically, in the setup procedure, the transmitting end may transmit an add block acknowledgement (ADDBA) request frame to the receiving end, and the receiving end may transmit an ADDBA response frame to the transmitting end. More specifically, the transmitting end may transmit an ADDBA request frame, which corresponds to a management frame, to the receiving frame. The ADDBA request frame may request a block ACK agreement for the current TID. The ADDBA request frame may transmit a block ACK policy type, a transmitting buffer size of the transmitting end, a time-out value of the block ACK session, information on a starting sequence number (SSN), and so on, to the receiving end. After receiving the ADDBA request frame, the receiving end may transmit an ADDBA response to the transmitting end as a response to the received ADDBA request frame. The ADDBA response frame may include block ACK agreement status, ACK policy, buffer size, time-out value, and so on.

During the transmitting procedure, the transmitting end may transmit an A-MPDU to the receiving end. In case the transmission condition of a block ack request (BAR) frame for the A-MPDU is satisfied, the transmitting end may transmit the BAR frame to the receiving end. In case the transmission of the A-MPDU by the transmitting end is successful, the receiving end that has received the BAR frame may transmit a block ACK for the A-MPDU to the transmitting end.

The tear down procedure may be carried out in case set up time values of inactivity timers, which are set up in the transmitting end and the receiving end, are expired, or if there are no more data that are to be transmitted for the corresponding TID. For example, with the expiration of the time out value set up in the inactivity timer for block ACK error recovery, a delete block acknowledgement (DELBA) frame may be transmitted to the receiving end or the transmitting end, and, then, the block ACK session may be ended. In case the transmitting end receives the block ACK, the inactivity timer of the transmitting end may be re-set. In case the receiving end receives the MPDU and the block ACK request frame, the inactivity timer of the receiving end may be re-set (or re-configured).

An AP operating in a wireless LAN system may transmit data to each of a plurality of STAs by using the same time resource. If the transmission from the AP to the STA is referred to as a downlink transmission, the transmission of such AP may be expressed by using the term downlink multi-user transmission (DL MU transmission) (or downlink multiple user transmission). In the legacy wireless LAN system, the AP was capable of performing DL MU transmission based on multiple input multiple output (MU MIMO), and such transmission may be expressed by using the term DL MU MIMO transmission. In the exemplary embodiment of the present invention, the AP may perform DL MU transmission based on an orthogonal frequency division multiplexing access (OFDMA), and such transmission may be expressed by using the term DL MU OFDMA transmission. In case the DL MU OFDMA transmission is used, the AP may transmit downlink data (or downlink frames) to each of the multiple STAs through each of the multiple frequency resources within an overlapped time resource.

Each of the PPDU, frame, and data that are transmitted via downlink transmission may be respectively expressed by using the terms downlink PPDU, downlink frame, and downlink data. The PPDU may correspond to a data unit including a PPDU header and a physical layer service data unit (PSDU) (or MAC protocol data unit (MPDU)). The PPDU header may include a PHY header and a PHY preamble, and the PSDU (or MPDU) may include a frame or may indicate a frame. A DL single user (SU) transmission may indicate a downlink transmission from the AP to one STA within the entire transmission resource.

Conversely, a transmission from an STA to the AP may be referred to as an uplink transmission, and the transmission of data from multiple STAs to the AP within the same time resource may be expressed by using the term uplink multi-user transmission (or uplink multiple user transmission). Unlike the legacy wireless LAN system, in the wireless LAN system according to the exemplary embodiment of the present invention, the UL MU transmission may also be supported. Each of the PPDU, frame, and data that are transmitted via uplink transmission may be respectively expressed by using the terms uplink PPDU, uplink frame, and uplink data. The uplink transmission that is performed by each of the multiple STAs may be performed within a frequency domain or a spatial domain.

In case the uplink transmission that is performed by each of the multiple STAs is performed within the frequency domain, different frequency resources respective to each of the multiple STAs may be allocated as uplink transmission resources based on orthogonal frequency division multiplexing access (OFDMA). Each of the multiple STAs may transmit an uplink frame to the AP by using the respective frequency resources allocated to each STA. Such transmission method using different frequency resources may also be expressed by using the term UL MU OFDMA transmission method.

In case the uplink transmission that is performed by each of the multiple STAs is performed within the spatial domain, different space time streams (or spatial streams) are allocated to each of the multiple STAs, and each of the multiple STAs may transmit an uplink frame to the AP by using different space time streams. Such as transmission method using different spatial streams may also be expressed by using the term UL MU MIMO transmission method. The UL SU transmission may indicate a downlink transmission from one STA to one AP within the entire transmission resource.

Hereinafter, the transmission of a block ACK frame, which is being transmitted as a response to the transmission of a downlink frame based on a DL MU OFDMA transmission is disclosed in the exemplary embodiment of the present invention. Hereinafter, the transmission of a downlink frame based on DL MU OFDMA will be mostly disclosed in the exemplary embodiment of the present invention. However, the block ACK transmission method, which will be disclosed below, may also be applied to the transmission of the block ACK frame, which is transmitted as a response to the transmission of the downlink frame based on DL MU MIMO.

Additionally, hereinafter, a first channel (e.g., a primary channel) and a second channel (e.g., a secondary channel) having the same bandwidth size (e.g., 20 MHz) will be assumed in the exemplary embodiment of the present invention. Moreover, a first channel and a second channel including each of the multiple subbands, which correspond to the frequency resources for the transmission that is based on DL MU OFDMA, will be assumed in the exemplary embodiment of the present invention. Each of the multiple subbands may be used for the transmission of downlink data that is performed by the AP to a specific STA. For example, each of the primary channel of 20 MHz and the secondary channel of 20 MHz may include 4 subbands of 5 MHz. The first channel may be defined to have diverse sizes, such as 20 MHz, 40 MHz, 80 MHz, and so on, and the second channel may also be defined to have diverse sizes, such as 20 MHz, 40 MHz, 80 MHz, and so on. Furthermore, the size of the subbands may also be defined to sizes other than 5 MHz, such as 10 MHz, 2.5 MHz, and so on.

The AP (or STA) may perform the following procedure in order to transmit downlink data through the first channel and the second channel. For example, the STA may perform a back-off procedure in the first channel and may acquire authority on the channel access within the first channel. Additionally, the STA may determine whether or not an additional channel band (e.g., secondary channel) is available for usage. For example, the AP may verify the channel status of the secondary channel during a point coordination function (PCF) interframe space (PIFS) duration before the expiration of the back-off timer. The second channel may correspond to the remaining channel excluding the first channel among the entire channel bands that are available for usage. The second channel may also be expressed differently by using the term non-primary channel.

More specifically, the AP may determine the status of a channel during the PIFS prior to the transmission opportunity (TXOP) in order to determine whether the second channel is idle or busy. If the second channel is determined to be busy during the PIFS, the STA may determine that the status of the second channel is idle. Hereinafter, it will be assumed in the exemplary embodiment of the present invention that the first channel and the second channel are available for usage.

Additionally, the distinction (or division) of the entire available frequency bandwidth (e.g., the first channel (primary channel) and the second channel (secondary channel)) and the distinction (or division) of the subbands (the 4 subbands included in each of the primary channel and the secondary channel) according to the exemplary embodiment of the present invention are arbitrarily performed. More specifically, the entire available frequency resources may be divided by using diverse methods (e.g., a first channel to an n-th channel and multiple subbands included in each of the channels), and the divided entire frequency resources may be used for the transmission of downlink data (or downlink frame) based on DL MU OFDMA, which is performed by the AP.

Figure 6:
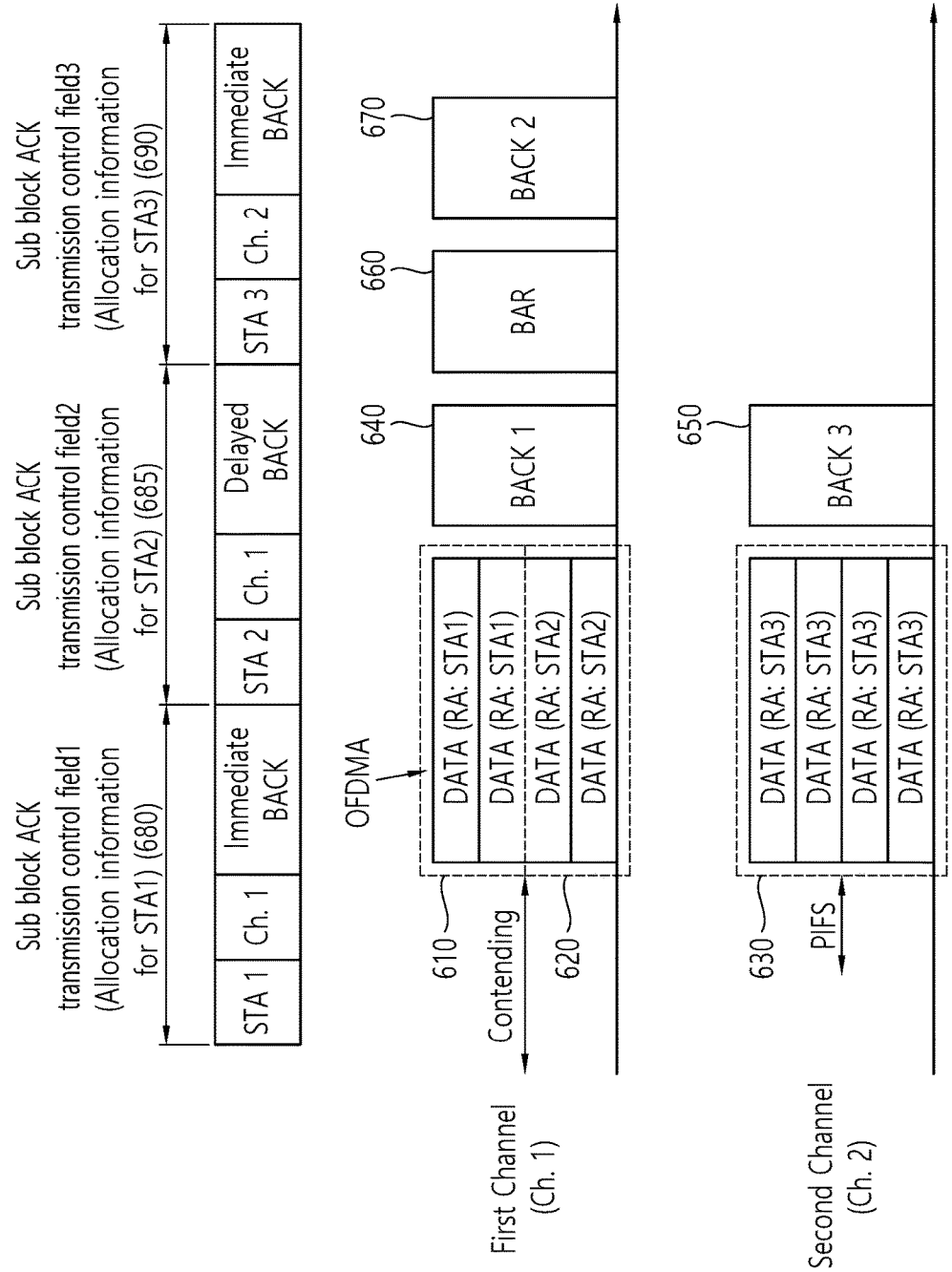
FIG. 6 is a conceptual diagram showing a method for transmitting a block ACK frame according to an exemplary embodiment of the present invention.

FIG. 6 is a conceptual diagram showing a method for transmitting a block ACK frame according to an exemplary embodiment of the present invention.

FIG. 6 discloses the transmission of a block ACK frame after the transmission of downlink data based on DL MU OFDMA, which is performed by the AP through each of the first channel (e.g, primary channel) and the second channel (e.g., secondary channel).

Referring to FIG. 6, the AP may transmit downlink data to each of the multiple STAs through each of the multiple channels (or through each of the subbands included in each of the multiple channels). hereinafter, the STA that has received indication from the AP to receive downlink data may be expressed by using the term target STA.

The AP may transmit downlink data to each of the multiple target STA through subbands allocated to each of the multiple target STAs. The downlink data may be carried to each of the multiple target STAs through a PPDU, which is based on a PPDU format or DL MU PPDU format that will hereinafter be described in detail in FIG. 15.

For example, the AP may transmit downlink data to multiple target STAs (STA1, STA2, and STA3 ) through the first channel and the second channel. The AP may transmit downlink data1 610 corresponding to STA1 to STA1 through 2 subbands among the 4 subbands included in the first channel, and the AP may transmit downlink data2 620 corresponding to STA2 to STA2 through the remaining 2 subbands. Additionally, the AP may transmit downlink data3 630 corresponding to STA3 to STA3 through 4 subbands among the 4 subbands included in the secondary channel.

The AP may transmit each of the multiple downlink PPDU, each including at least one downlink frame (or downlink data corresponding to at least one target STA), through each of the multiple channels. For example, downlink data1 610 and downlink data2 620, which are respectively transmitted to STA1 and STA2 by the AP based on DL MU OFDMA through the first channel, may be transmitted based on downlink PPDU1, and downlink data3 630, which is transmitted to STA3 based on DL MU OFDMA, may be transmitted based on downlink PPDU2. Each of downlink PPDU1 and downlink PPDU2 may each correspond to a data unit that is generated based on an inverse fast fourier transform (IFFT) (or IFT) process. A PPDU header of downlink PPDU2 may include identification information of STA3, which is to receive downlink data3 360 through the subband included in the transmission channel of downlink PPDU2, and information on the subband that is allocated to STA3.

Alternatively, the AP may also transmit a PPDU of the DL MU PPDU format including downlink data1 610, downlink data2 620, and downlink data3 630 corresponding to the target STAs (STA1, STA2, and STA3) through the first channel and the second channel based on DL MU OFDMA. According to the exemplary embodiment of the present invention, a PPDU of the DL MU PPDU format, which is generated based on a single IFFT process within multiple channels (e.g., the first channel and the second channel), may transmit downlink data corresponding to each of the multiple STAs to each of the multiple STAs within multiple channels. A PPDU header of the PPDU of the DL MU PPDU format, which is generated based on a single IFFT process within multiple channels, may include identification information of each of STA1, STA2, and STA3, which are to receive downlink data within multiple channels, and information on the subbands that are allocated each of STA1, STA2, and STA3, among the subbands included in the multiple channels.

The plurality of target STAs may perform decoding on the downlink data that are transmitted by the AP, and then the target STAs may transmit a block ACK frame including information on whether or not the decoding is successful to the AP.

Each of the multiple target STAs that has received the downlink data may transmit a block ACK frame to the ACK based on an ACK transmission policy, which is determined by the AP, through a transmission resource of a block ACK frame (or an allocation channel for transmitting the block ACK frame or a block ACK frame transmitting channel), which is determined by the AP.

The downlink frame, header being included in the downlink PPDU, or additional field information, which are included in the downlink data transmitted by the AP, may include information on a block ACK frame transmission resource corresponding to each of the multiple target STAs and information on a transmission policy of a block ACK frame corresponding to each of the multiple target STAs.

The information for the transmission of the block ACK frame by the target STAs (e.g., identification information of each of the multiple target STAs, information on the block ACK frame transmission resource corresponding to each of the multiple target STAs, transmission policy of the block ACK frame corresponding to each of the multiple target STAs, and so on) may be included in the MAC header of the downlink frame and/or the PPDU header of the downlink PPDU as a block ACK transmission control field (or an allocated channel information field, hereinafter referred to as a block ACK transmission control field) or as a field (block ACK transmission control field) being added to the end of the payload.

The above-described transmission method of the information for transmitting the block ACK frame of the target STA is merely an example, and, therefore, the information for transmitting the block ACK frame of the target STA may also be transmitted by using other diverse methods (e.g., one frame or multiple fields within the PPDU or different frames or PPDUs).

The block ACK transmission control field may include a plurality of sub block ACK transmission control fields including block ACK transmission resources on each of the multiple target STAs and information on the transmission policy of the block ACK frame. The sub block ACK transmission control field may include identifier information of a specific target STA, information on a block ACK transmission resource allocated to a specific target STA, and information on a block ACK transmission policy of a specific target STA.

Referring to FIG. 6, the block ACK transmission control field may include a sub block ACK transmission control field 1 680 for STA1, a sub block ACK transmission control field 2 685 for STA2, and a sub block ACK transmission control field 3 690 for STA3.

The sub block ACK transmission control field 1 680 may include identifier information (e.g., MAC address, association identifier (AID), partial association identifier (PAID)) of STA1, information (e.g., identification information of the first channel) on the block ACK transmission resource allocated to STA1, and information (e.g., immediate block ACK) on the block ACK transmission policy of STA1.

The sub block ACK transmission control field 2 685 may include identifier information of STA2, information (e.g., identification information of the first channel) on the block ACK transmission resource allocated to STA2, and information (e.g., delayed block ACK) on the block ACK transmission policy of STA2.

The sub block ACK transmission control field 3 690 may include identifier information of STA3, information (e.g., identification information of the second channel) on the block ACK transmission resource allocated to STA3, and information (e.g., immediate block ACK) on the block ACK transmission policy of STA3.

In case the transmission policy of the block ACK frame corresponds to an immediate block ACK, the STA may immediately transmit a block ACK frame to the AP without any separate trigger frame after a predetermined time period (e.g., short interframe space (SIFS)) after receiving the downlink data. And, in case the transmission policy of the block ACK frame corresponds to a delayed block ACK, after receiving the downlink data, the STA may receive a BAR frame from the AP, and, then, as a response to the received BAR frame, the STA may transmit a block ACK frame to the AP.

More specifically, the AP may determine the method for transmitting the block ACK frame and the transmission resource of the block ACK frame respective to each of the multiple target STAs and may transmit the determined information to each of the multiple STAs through a downlink PPDU.

The STA, which has received the block ACK transmission control field including the above-described sub block ACK transmission control field, may transmit a block ACK frame to the AP through the transmission resource of the block ACK frame, which is determined by the AP, by using the transmission policy of the block ACK frame, which is determined by the AP.

STA1, which has received indication to perform immediate block ACK transmission from the AP through the first channel, may receive downlink data1 610 corresponding to STA1, and, then, after a predetermined period of time (e.g., SIFS), as a response to the received downlink data1 610, STA1 may immediately transmit block ACK frame1 640 through the first channel.

STA2, which has received indication to perform delayed block ACK transmission from the AP through the first channel, may receive downlink data2 620 corresponding to STA2, and, then, after receiving a BAR frame from the AP, as a response to the received downlink data2 620, STA2 may transmit block ACK frame2 670 through the first channel.

STA3, which has received indication to perform immediate block ACK transmission from the AP through the second channel, may receive downlink data3 630 corresponding to STA3, and, then, after a predetermined period of time (e.g., SIFS), as a response to the received downlink data3 630, STA3 may immediately transmit block ACK frame3 650 through the second channel. Block ACK frame1 640 and block ACK frame2 670 may be transmitted within an overlapped time resource.

Figure 7:
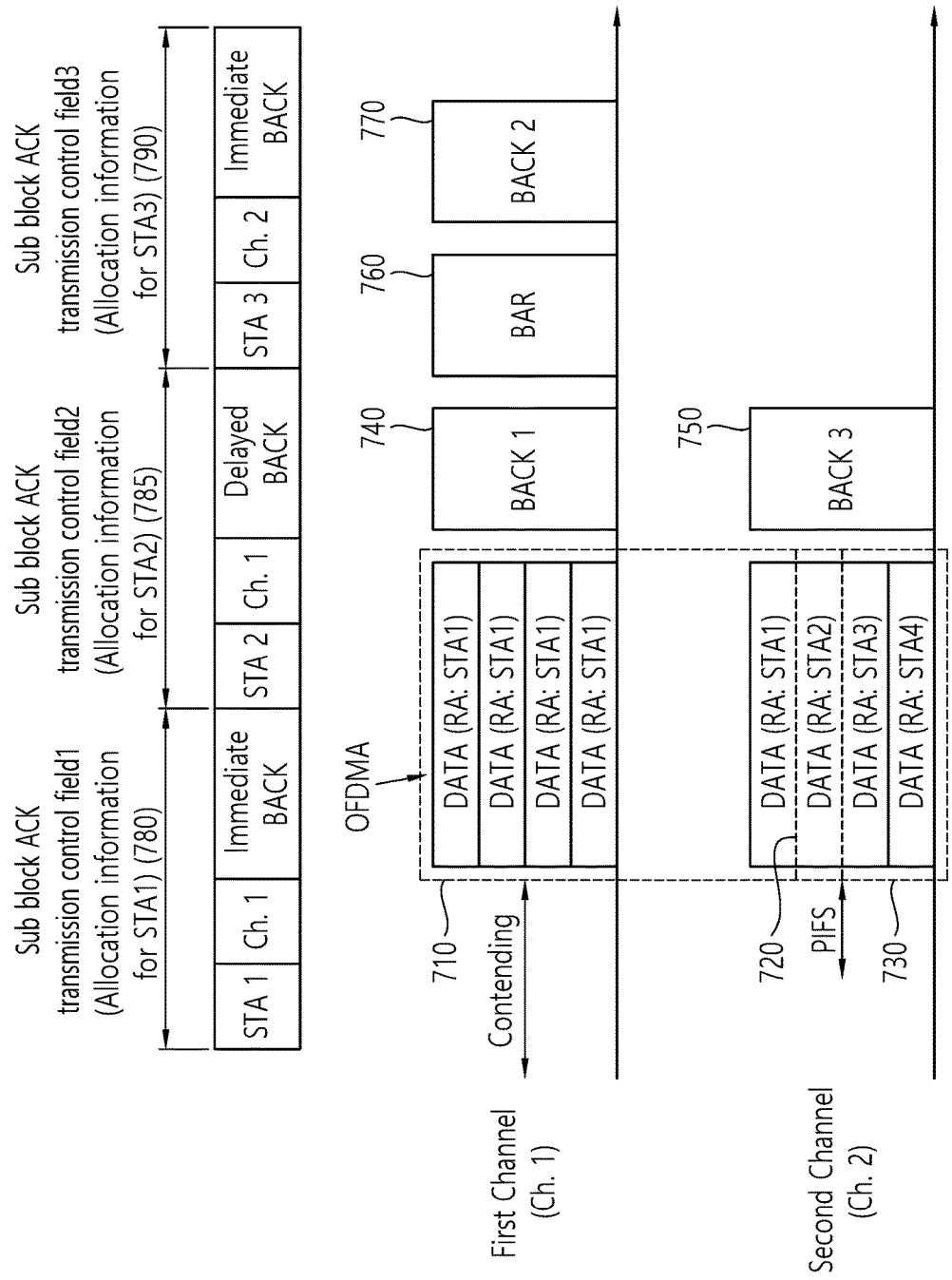
FIG. 7 is a conceptual diagram showing a method for transmitting a block ACK frame according to an exemplary embodiment of the present invention.

FIG. 7 is a conceptual diagram showing a method for transmitting a block ACK frame according to an exemplary embodiment of the present invention.

FIG. 7 discloses a method for transmitting a block ACK frame after the transmission of downlink data based on DL MU OFDMA performed by the AP through each of the first channel and the second channel. Most particularly, disclosed herein is a case when the receiving channel of the downlink data of a specific STA and the transmitting channel of a block ACK frame corresponding to the downlink data are different from one another.

Referring to FIG. 7, the AP may transmit downlink data1 to STA1 through a subband included in the first channel and the second channel based on a DL MU OFDMA transmission, and the AP may respectively transmit downlink data1 710, downlink data2 720, and downlink data3 730 to STA1, STA2, and STA3 through subbands included in the second channel. Downlink data1 710 may correspond to data being buffered (or pending) in the AP for STA1, downlink data2 720 may correspond to data pending in the AP for STA2, and downlink data3 730 may correspond to data being buffered in the AP for STA3.

More specifically, STA1 may receive downlink data1 710 from the AP through the first channel and the second channel, and each of STA2 and STA3 may respectively receive downlink data2 720 and downlink data3 730 through the second channel.

The AP may determine the method for transmitting the block ACK frame and the transmission resource of the block ACK frame respective to each of the multiple target STAs and may transmit the determined information to each of the multiple STAs through a downlink PPDU. More specifically, the AP may determine an immediate block ACK transmission through the first channel of STA1, a delayed block ACK transmission through the first channel of STA2, and an immediate block ACK transmission through the second channel of STA3. The AP may transmit information on a transmission method of a block ACK frame and information on transmission resource of the block ACK frame to each of STA1, STA2, and STA3 based on the block ACK transmission control field included in the downlink PPDU.

The block ACK transmission control field may include a sub block ACK transmission control field 1 780, a sub block ACK transmission control field 2 785, and a sub block ACK transmission control field 3 790.

The sub block ACK transmission control field 1 780 may include identifier information of STA1, information (e.g., identification information of the first channel) on the block ACK transmission resource allocated to STA1, and information (e.g., immediate block ACK) on the block ACK transmission policy of STA1 .

The sub block ACK transmission control field 2 785 may include identifier information of STA2, information (e.g., identification information of the first channel) on the block ACK transmission resource allocated to STA2, and information (e.g., delayed block ACK) on the block ACK transmission policy of STA2.

The sub block ACK transmission control field 3 790 may include identifier information of STA3, information (e.g., identification information of the second channel) on the block ACK transmission resource allocated to STA3, and information (e.g., immediate block ACK) on the block ACK transmission policy of STA3.

STA1, which has received indication to perform immediate block ACK transmission from the AP through the first channel, may receive downlink data1 710 corresponding to STA1, and, then, after a predetermined period of time (e.g., SIFS), as a response to the received downlink data1 710, STA1may immediately transmit block ACK frame1 740 through the first channel.

STA2, which has received indication to perform delayed block ACK transmission from the AP through the first channel, may receive downlink data2 720 corresponding to STA2, and, then, after receiving a BAR frame from the AP, as a response to the received downlink data2 720, STA2 may transmit block ACK frame2 770 through the first channel.

STA3, which has received indication to perform immediate block ACK transmission from the AP through the second channel, may receive downlink data3 730 corresponding to STA3, and, then, after a predetermined period of time (e.g., SIFS), as a response to the received downlink data3 730, STA3 may immediately transmit block ACK frame3 750 through the second channel. Block ACK frame1 740 and block ACK frame3 750 may be transmitted within an overlapped time resource.

In case of STA2, STA2 may receive downlink data2 720 through a subband included in the second channel, and, in accordance with the indication of the AP, STA2 may transmit block ACK frame2 770 to the AP through the first channel. More specifically, the receiving channel of the downlink data of a specific STA and the transmitting channel of a block ACK frame corresponding to the downlink data may be different from one another.

Figure 8:
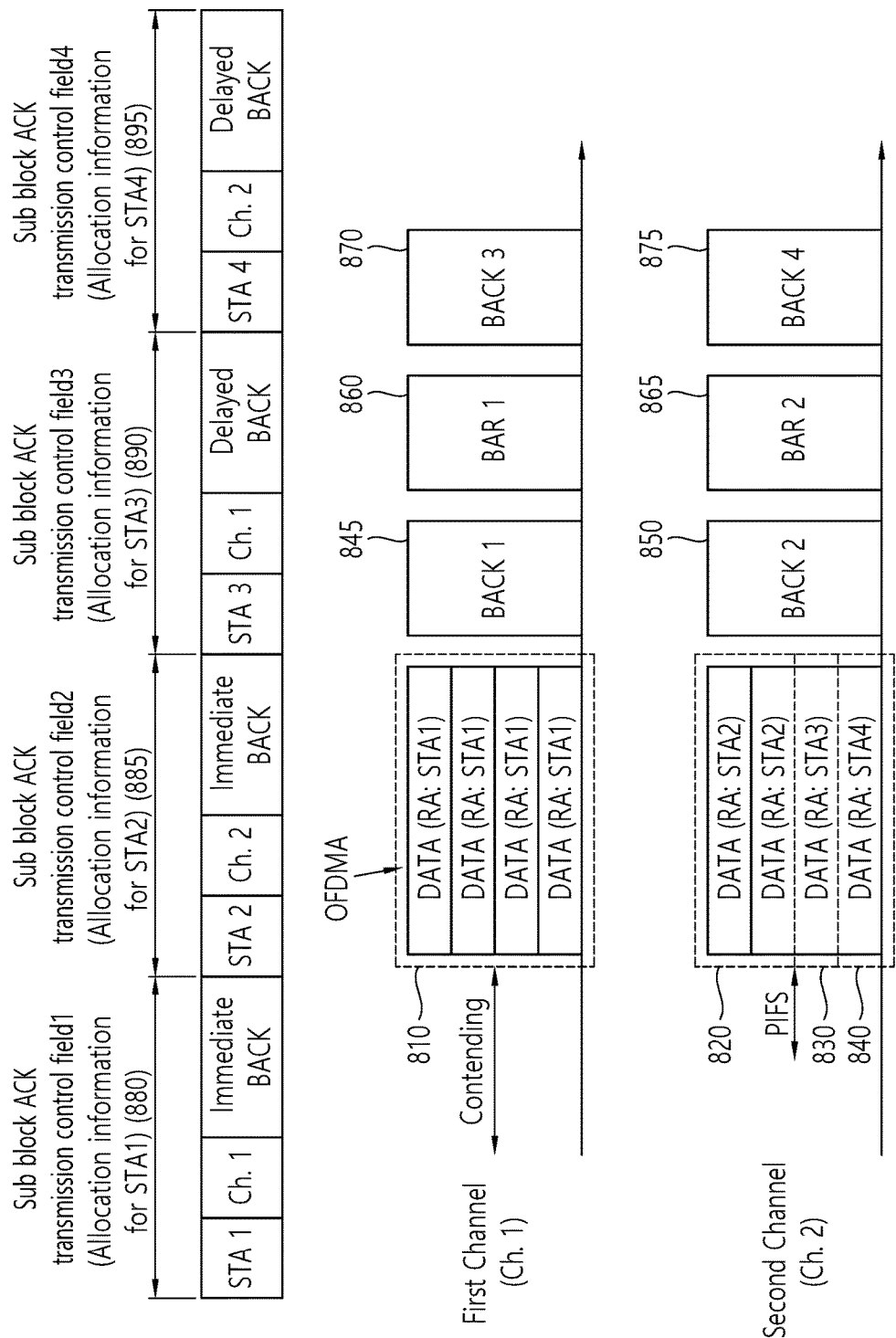
FIG. 8 is a conceptual diagram showing a method for transmitting a block ACK frame according to an exemplary embodiment of the present invention.

FIG. 8 is a conceptual diagram showing a method for transmitting a block ACK frame according to an exemplary embodiment of the present invention.

FIG. 8 discloses a method for transmitting a block ACK frame after the transmission of downlink data based on DL MU OFDMA performed by the AP through each of the first channel and the second channel. Most particularly, disclosed herein is a case when there are 4 target STAs and when the receiving channel of the downlink data of a specific STA and the transmitting channel of a block ACK frame corresponding to the downlink data are different from one another.

Referring to FIG. 8, the AP may transmit downlink data1 810 to STA1 through a subband included in the first channel based on a DL MU OFDMA transmission, and the AP may respectively transmit downlink data2 820, downlink data3 830, and downlink data4 840 to STA2, STA3, and STA4 through subbands included in the second channel.

More specifically, STA1 may receive downlink data1 810 from the AP through the first channel, and each of STA2, STA3, and STA4 may respectively receive downlink data2 820, downlink data3 830, and downlink data4 840 through the second channel.

The AP may determine the method for transmitting the block ACK frame and the transmission resource of the block ACK frame respective to each of the multiple target STAs and may transmit the determined information to each of the multiple STAs through a downlink PPDU. More specifically, the AP may determine an immediate block ACK transmission through the first channel of STA1, an immediate block ACK transmission through the second channel of STA2, a delayed block ACK transmission through the first channel of STA3, and a delayed block ACK transmission through the second channel of STA4.

The AP may transmit information on a transmission method of a block ACK frame and information on transmission resource of the block ACK frame to each of STA1, STA2, STA3, and STA4 based on the block ACK transmission control field.

The block ACK transmission control field may include a sub block ACK transmission control field 1 880, a sub block ACK transmission control field 2 885, a sub block ACK transmission control field 3 890, and a sub block ACK transmission control field 4 895.

The sub block ACK transmission control field 1 880 may include identifier information of STA1, information (e.g., identification information of the first channel) on the block ACK transmission resource allocated to STA1, and information (e.g., immediate block ACK) on the block ACK transmission policy of STA1.

The sub block ACK transmission control field 2 885 may include identifier information of STA2, information (e.g., identification information of the second channel) on the block ACK transmission resource allocated to STA2, and information (e.g., immediate block ACK) on the block ACK transmission policy of STA2.

The sub block ACK transmission control field 3 890 may include identifier information of STA3, information (e.g., identification information of the first channel) on the block ACK transmission resource allocated to STA3, and information (e.g., delayed block ACK) on the block ACK transmission policy of STA3.

The sub block ACK transmission control field 4 895 may include identifier information of STA4, information (e.g., identification information of the second channel) on the block ACK transmission resource allocated to STA4, and information (e.g., delayed block ACK) on the block ACK transmission policy of STA4.

STA1, which has received indication to perform immediate block ACK transmission from the AP through the first channel, may receive downlink data1 810 corresponding to STA1, and, then, after a predetermined period of time (e.g., SIFS), as a response to the received downlink data1 810, STA1 may transmit block ACK frame1 845 through the first channel.

STA2, which has received indication to perform immediate block ACK transmission from the AP through the second channel, may receive downlink data2 820 corresponding to STA2, and, then, after a predetermined period of time (e.g., SIFS), as a response to the received downlink data2 820, STA2 may immediately transmit block ACK frame2 850 through the second channel. Block ACK frame1 845 and block ACK frame2 850 may be transmitted within an overlapped time resource.

STA3, which has received indication to perform delayed block ACK transmission from the AP through the first channel, may receive downlink data3 830 corresponding to STA3, and, then, after receiving a BAR frame 860 from the AP, as a response to the received downlink data3 830, STA3 may transmit block ACK frame3 870 through the first channel.

STA4, which has received indication to perform delayed block ACK transmission from the AP through the second channel, may receive downlink data4 840 corresponding to STA4, and, then, after receiving a BAR frame 865 from the AP, as a response to the received downlink data4 840, STA4 may transmit block ACK frame4 875 through the second channel. Block ACK frame3 870 and block ACK frame4 875 may be transmitted within an overlapped time resource.

Figure 9:
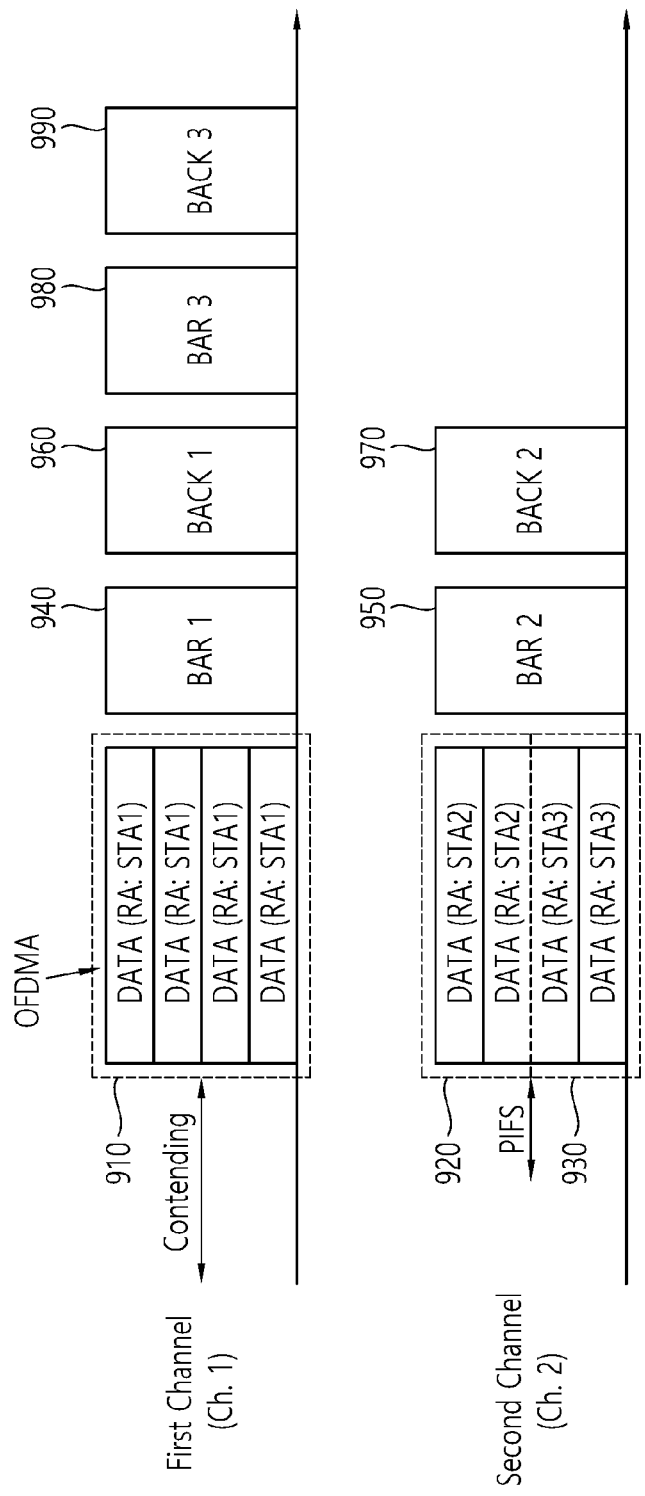
FIG. 9 is a conceptual diagram showing a method for transmitting a block ACK frame according to an exemplary embodiment of the present invention.

FIG. 9 is a conceptual diagram showing a method for transmitting a block ACK frame according to an exemplary embodiment of the present invention.

FIG. 9 discloses a method for transmitting a block ACK frame after the transmission of downlink data based on DL MU OFDMA performed by the AP through each of the first channel and the second channel. Most particularly, disclosed herein is a transmission method of a block ACK frame performed by the AP based on the block ACK transmission control field and operations of a target STA that has failed to receive indication on the transmission resource of the block ACK frame.

In case the target STA fails to receive the transmission method of the block ACK frame and the transmission resource of the block ACK frame from the AP based on the block ACK transmission control field, the target STA may receive a BAR frame and may transmit a block ACK frame to the AP as a response to the received BAR frame.

Referring to FIG. 9, based on a DL MU OFDMA transmission, the AP may transmit downlink data1 to STA1 through a subband included in the first channel, and the AP may respectively transmit downlink data2 and downlink data3 to STA2 and STA3 through a subband included in the second channel.

More specifically, STA1 may receive downlink data1 910 from the AP through the first channel, and each of STA2 and STA3 may respectively receive downlink data2 920 and downlink data3 930 from the AP through the second channel.

In case STA1, STA2, and STA3 fail to receive indication on the transmission method of the block ACK frame and the transmission resource of the block ACK frame from the AP based on the block ACK transmission control field, each of STA1, STA2, and STA3 may receive a BAR frame 940, 950, and 980 and may transmit a block ACK frame 960, 970, and 990 to the AP as a response to the received BAR frame 940, 950, and 980.

After receiving downlink data1 910, STA1 may receive BAR frame1 940 corresponding to STA1 and may then transmit block ACK frame1 960 to the AP as a response to the received BAR frame1 940.

Also, STA2 may receive BAR frame2 950 corresponding to STA2 and may then transmit block ACK frame2 970 to the AP as a response to the received BAR frame2 950.

Also, STA3 may receive BAR frame3 980 corresponding to STA3 and may then transmit block ACK frame3 990 to the AP as a response to the received BAR frame3 980.

Although STA3 has received downlink data3 930 through the second channel, STA3 may receive BAR frame3 980 through the first channel and may transmit block ACK frame3 990 through the first channel.

In case the first channel corresponds to a primary channel and the second channel corresponds to a secondary channel, in order to prevent an ending (or completion) of the transmission procedure of the block ACK frame through the first channel from occurring earlier (or faster) than the transmission procedure of the block ACK frame through the second channel (or in order to prevent the block ACK transmission procedure from being performed only through the second channel (or secondary channel)), the AP may determine a transmission channel of the BAR frame.

As shown in FIG. 9, by transmitting the BAR frame3 980 corresponding to STA3 through the first channel, and by receiving the block ACK frame3 990 being transmitted by STA3 through the first channel, the AP may prevent the block ACK transmission procedure from being performed only through the second channel.

A clear channel assessment (CCA) level (or CCA threshold value) that is used for determining only whether the second channel (secondary channel) is idle or busy may be higher than a CCA level that is used for determining whether the first channel (primary channel) is idle or busy. In this case, non-target STAs excluding the target STAs may determine relatively more easily that the secondary channel is idle, and the likelihood of collision between the frames being transmitted through the secondary channel may be relatively higher. Therefore, in order to reduce the collision between the frame, the transmission or reception procedure of the block ACK frame through the secondary channel may be configured to end (or be completed) earlier than the transmission or reception procedure of the block ACK frame through the primary channel. Based on the above-described method, the overall wireless LAN transmission efficiency may be enhanced.

Figure 10:
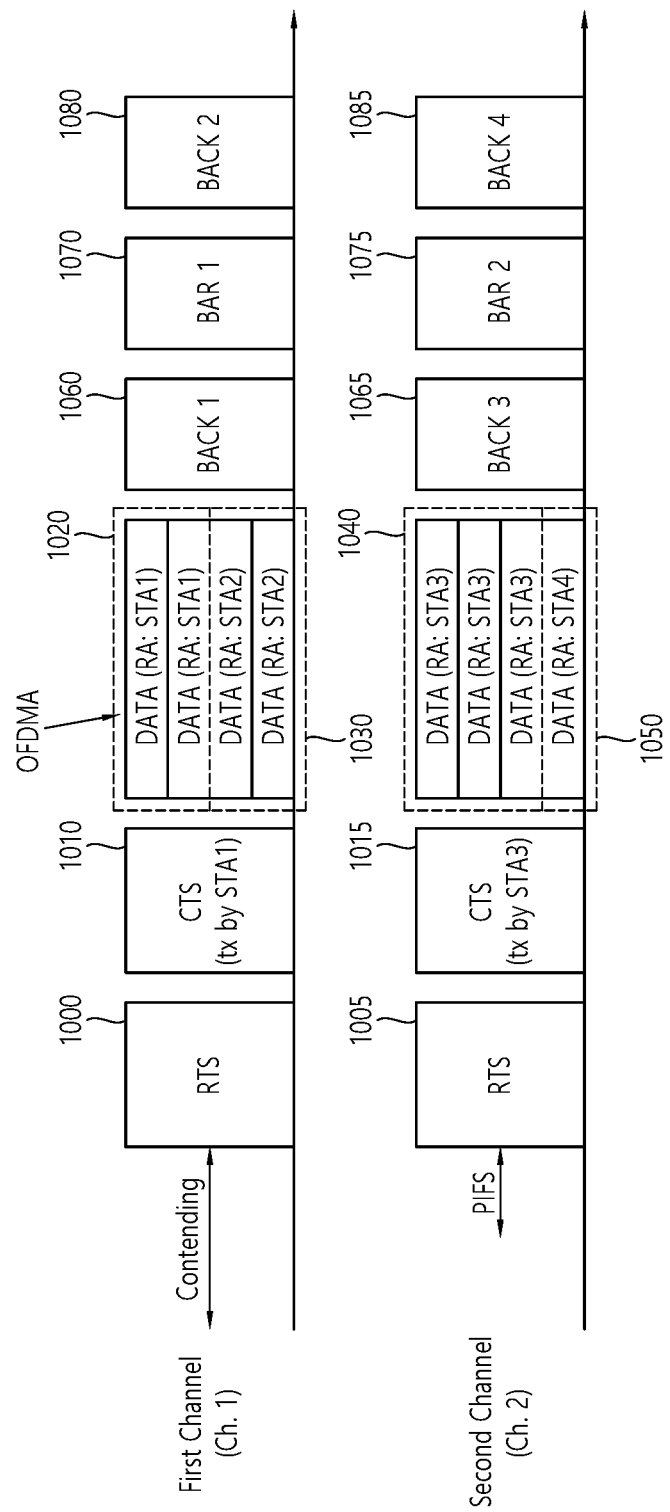
FIG. 10 is a conceptual diagram showing a method for transmitting a block ACK after performing DL MU OFDMA transmission based on medium protection according to an exemplary embodiment of the present invention.

FIG. 10 is a conceptual diagram showing a method for transmitting a block ACK after performing DL MU OFDMA transmission based on medium protection according to an exemplary embodiment of the present invention.

FIG. 10 discloses a transmission of the downlink data performed by the AP based on DL MU OFDMA through each of the primary channel and the secondary channel after performing a medium protection procedure based on a RTS frame and a CTS frame.

Referring to FIG. 10, the AP may transmit multiple RTS frame through each of the multiple channels within an overlapped time resource. The AP may transmit RTS frame1 1000 and RTS frame2 1005 through each of the first channel and the second channel.

Each of the multiple RTS frames being respectively transmitted through each of the multiple channels may include information on the target STAs that are to receive the downlink data (or RTS frame) through each of the transmitting channels respective the multiple RTS frames and/or information on the downlink resource for the target STAs.

For example, RTS frame1 1000 being transmitted by the AP through the first channel may include identification information on each of the at least one target STA that is to receive the downlink data that are being transmitted from the AP through the first channel and/or information on the downlink resource being allocated for the transmission of the downlink data to each of the at least one target STA. Additionally, RTS frame2 1005 being transmitted by the AP through the secondary channel may include identification information on each of the at least one target STA that is to receive the downlink data that are being transmitted from the AP through the first channel and/or information on the downlink resource being allocated for the transmission of the downlink data to each of the at least one target STA.

More specifically, according to the exemplary embodiment of the present invention, each of the multiple RTS frames being respectively transmitted through each of the multiple channels by the AP may include identification information of the at least one target STA that is to receive downlink data through multiple subbands being included in the transmitting channel through which the RTS frame was transmitted and/or information on downlink resources being allocated to at least one target STA for the transmission of downlink data.

More specifically, a receiving address (RA) field of the RTS frames being transmitted through each of the multiple channels may include information on the target STA that is to receive downlink data (or that is to receive a RTS frame) through a target STA allocated subband being included in the transmitting channel of the RTS frame. Additionally, the RA field being included in the RTS frame or another separate resource allocation field may include information on the target STA allocated subband. Alternatively, a PPDU header of a RTS PPDU carrying the RTS frame may include identification information of the target STA and information on the target STA allocated subband.

For example, the RA field of RTS frame1 1000, which is transmitted through the first channel, may include information on the identifiers (e.g., MAC address, association identifier (AID), and partial association identifier (PAID)) of each of STA1 and STA2, which correspond to the target STAs that are to receive the downlink data first channel. Additionally, the RA field (or resource allocation field) of RTS frame1 1000 may also include information on the subband (or frequency resource) that is allocated for each of the STA1 and STA2 as the information on the target STA allocated subband.

The RA field of RTS frame2 1005, which is transmitted through the second channel, may include information on the identifiers (e.g., MAC address, AID, and PAID) of each of STA3 and STA4, which correspond to the target STAs that are to receive the downlink data through the second channel. Additionally, the RA field (or resource allocation field) of RTS frame2 1005 may also include information on the resource (or subband) that is allocated for each of the STA3 and STA4 as the information on the target STA allocated subband. For example, the RA field (or resource allocation field) of RTS frame2 1005 may indicate that, among the 4 subbands being included in the secondary channel, 3 subbands are allocated to STA3 for the transmission of the downlink data, and the remaining 1 subband is allocated to STA4 for the transmission of the downlink data.

Although each of the multiple RTS frame being respectively transmitted through the multiple channels may also be transmitted through each of the multiple channels based on separate RTS PPDUs (RTS PPDU1 including RTS frame1 1000, RTS PPDU2 including RTS frame2 1005), the RTS frames may also be transmitted through a single RTS PPDU within the entire transmission resource including multiple channels (e.g., the first channel and the second channel). The single RTS PPDU for the transmission of the RTS frame may correspond to a DL MU PPDU format, which will be described later on. The DL MU PPDU format may include a PPDU header including an overlapped (or duplicated) field. More specifically, the entire target STAs that are to receive the downlink frames (RTS frames) within the entire transmission resource may be indicated in the PPDU header of one RTS PPDU, and frequency resources for receiving downlink data of each of the entire target STAs may also be indicated in the PPDU header of the one RTS PPDU.

As shown in FIG. 10, the PPDU header of one RTS PPDU may include identification information of the entire target STAs (e.g., STA1, STA2, STA3, and STA4,) operating within the entire transmission resource and information on a frequency resource (first channel) that is allocated to some of the target STAs (STA1, STA2 ), among the entire target STAs, and a frequency resource (second channel) that is allocated to the remaining target STAs (STA3, STA4,). STA1 and STA2 may receive RTS frame1 1000, which is transmitted through the first channel based on the PPDU header information, and STA3 and STA4 may receive RTS frame2 1005, which is transmitted through the second channel based on the PPDU header information.

According to the exemplary embodiment of the present invention, among the multiple target STAs receiving a RTS frame that is transmitted through one channel, among the multiple channels, only one target STA may transmit a CTS frame to the AP as a response to the received RTS frame. Among the multiple target STAs, the remaining target STAs, excluding the one target STA transmitting the CTS frame, may not transmit CTS frames to the AP. Hereinafter, the one target STA transmitting the CTS frame may be expressed by using the term CTS frame transmitting STA. The CTS frame transmitting STA may transmit a CTS frame to the AP through the same channel and the transmitting channel of the RTS frame.

More specifically, among STA1 and STA2, which correspond to the multiple target STAs that have received the RTS frame1 1000 through the first channel, one target STA may transmit CTS frame1 1010 to the AP through the first channel. And, among STA3 and STA4, which correspond to the multiple target STAs that have received the RTS frame2 1005 through the second channel, one target STA may transmit CTS frame2 1015 to the AP through the second channel.

The CTS frame transmitting STA may be determined based on diverse methods.

For example, the CTS frame transmitting STA may be determined based on the RA field included in the RTS frame. The CTS frame transmitting STA may correspond to the first (or foremost) STA to be indicated in an order of multiple target STAs being indicated based on the RA field of the RTS frame. For example, multiple bits being included in the RA field may sequentially indicate multiple target STAs, and the CTS frame transmitting STA may correspond to the target STA that is indicated by the bit being located in the foremost position (or being the first to be decoded), among the multiple bits included in the RA field. Alternatively, the CTS frame transmitting STA may correspond to the target STA that is the first to be decoded and identified, when decoding the RA field.

The RA field of RTS frame1 1000, which is transmitted through the first channel, may sequentially include an identifier of STA1 and an identifier of STA2 . In this case, among STA1 and STA2, STA1, which is the first to be indicated based on the RA field, may correspond to the CTS frame transmitting STA. Each of STA1 and STA2 may decode the RA field of RTS frame1 1000 and may determine whether or not to transmit the CTS frame based on the decoded result. STA1 may determine the transmission of CTS frame based on the RA field, and STA2 may determine the non-transmission of the CTS frame based on the RA field. STA1 being the CTS frame transmitting STA may transmit the CTS frame1 1010 to the AP through the first channel.

The RA field of RTS frame2 1005, which is transmitted through the second channel, may sequentially include an identifier of STA3 and an identifier of STA4,. In this case, among STA3 and STA4, STA3, which is the first to be indicated based on the RA field, may correspond to the CTS frame transmitting STA. Each of STA3 and STA4 may decode the RA field of RTS frame2 1005 and may determine whether or not to transmit the CTS frame based on the decoded result. STA3 may determine the transmission of CTS frame based on the RA field, and STA4 may determine the non-transmission of the CTS frame based on the RA field. STA3 being the CTS frame transmitting STA may transmit the CTS frame2 1015 to the AP through the second channel.

CTS frame1 1010, which is being transmitted by STA1, as a response to RTS frame1 1000, within a predetermined period of time after receiving the RTS frame1 1000, and CTS frame2 1015, which is being transmitted by STA3, as a response to RTS frame2 1005, within a predetermined period of time after receiving the RTS frame2 1005, may be transmitted to the AP within an overlapped time resource. CTS frame1 1010 and CTS frame2 1015 may correspond to frames including the same information. CTS frame1 1010 and CTS frame2 1015 may be transmitted to the AP within a decoding range without any collision between the frames.

According to another exemplary embodiment of the present invention, the CTS frame transmitting STA may be determined based on the size of the allocated subband (or resource). The method for determining the CTS frame transmitting STA based on the size of the allocated subband (or resource) will be described later on. Alternatively, the CTS frame transmitting STA may also be randomly determined by the AP or the STA.

After performing the medium protection procedure based on the above-described RTS frame and CTS frame, the AP may transmit downlink data to each of the multiple STA targets through each of the multiple channels (or each of the subbands included in the multiple channels).

The AP may transmit downlink data to each of the multiple STAs through the subbands allocated to the target STA that is indicated based on the RTS frame (or subbands allocated to the target STA that is indicated based on the downlink PPDU). The downlink data may be carried through a PPDU that is based on a PPDU format or DL MU PPDU format, which will be described later on.

Among the 4 subbands included in the primary channel, the AP may transmit downlink data1 1020 corresponding to STA1to STA1through 2 subbands, and the AP may transmit downlink data2 1030 corresponding to STA2 to STA2 through the remaining 2 subbands.

Among the 4 subbands included in the primary channel, the AP may transmit downlink data3 1040 corresponding to STA3 to STA3 through 3 subbands, and the AP may transmit downlink data4 1050 corresponding to STA4 to STA4 through the remaining 1 subband.

According to the exemplary embodiment of the present invention, the CTS frame transmitting STA, which transmitted the CTS frame to the AR may correspond to the STA performing immediate block ACK transmission. For example, STA1, which transmitted CTS frame1 1010 through the first channel may receive downlink data1 1020, and, then, after a predetermined period of time (e.g., SIFS), STA1may transmit a block ACK frame1 1060 corresponding to downlink data1 1020 to the AP. Additionally, STA3, which transmitted CTS frame2 1015 through the second channel may receive downlink data3 1040, and, then, after a predetermined period of time (e.g., SIFS), STA3 may transmit a block ACK frame3 1065 corresponding to downlink data3 1040 to the AP.

The other target STAs (STA2 and STA4,) may receive a BAR frame from the AP and may transmit a block ACK frame to the AR STA2 may receive BAR frame1 1070 through the first channel and may transmit block ACK frame2 1080 to the AP as a response to the received BAR frame1 1070. STA4 may receive BAR frame2 1075 through the second channel and may transmit block ACK frame4 1085 to the AP as a response to the received BAR frame2 1075.

Figure 11:
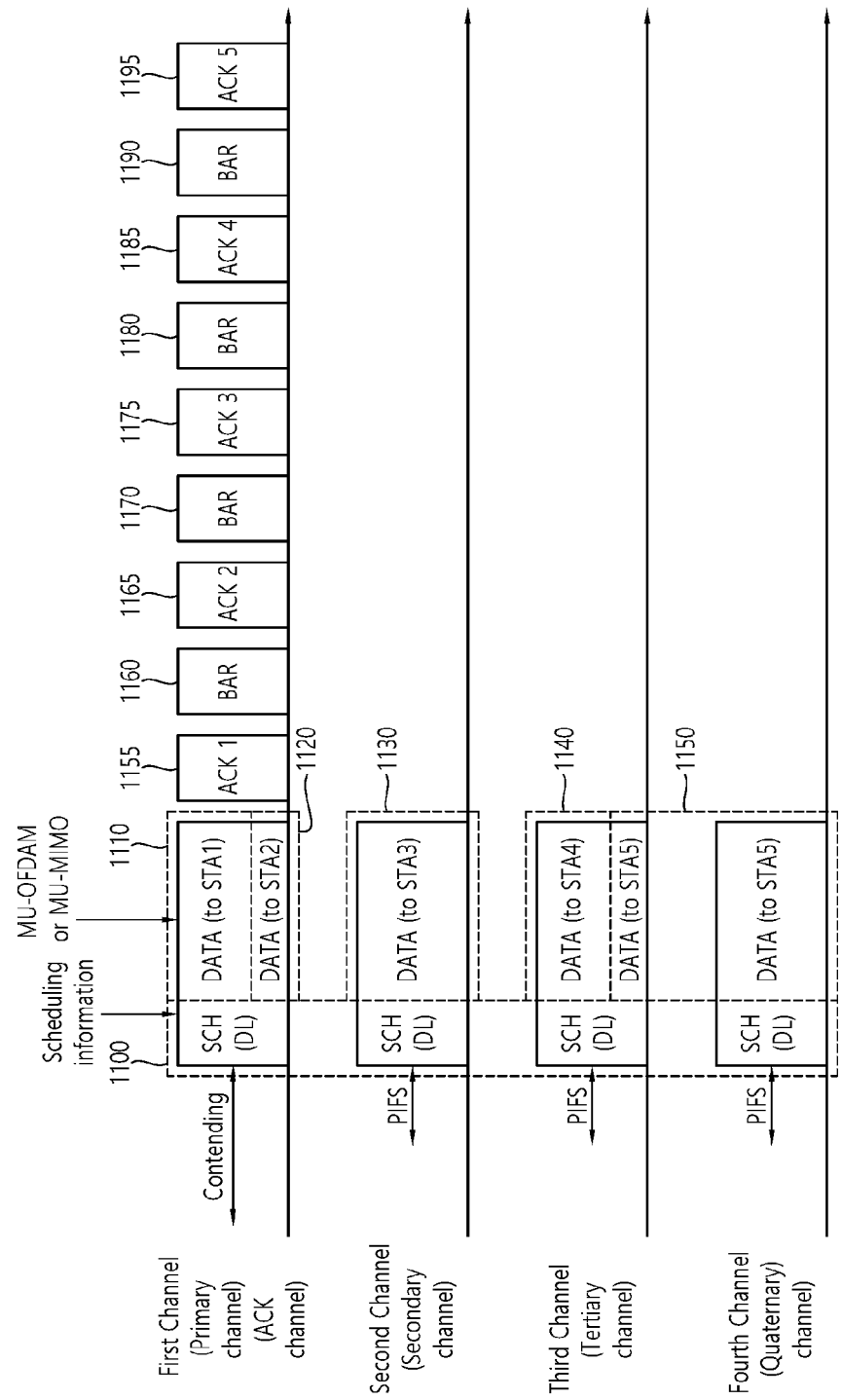
FIG. 11 is a conceptual diagram showing a method for transmitting a block ACK frame according to an exemplary embodiment of the present invention.

FIG. 11 is a conceptual diagram showing a method for transmitting a block ACK frame according to an exemplary embodiment of the present invention.

FIG. 11 discloses a method for transmitting a block ACK frame after the transmission of downlink data based on DL MU OFDMA performed by the AR Most particularly, disclosed herein is a method for performing transmission within an allocated transmission resource (e.g., one allocated channel) that is allocated to each block ACK frame being transmitted by each of the entire target STAs.

Referring to FIG. 11, the AP may transmit a downlink PPDU (or downlink frame) including the block ACK frame control field to each of the multiple target STAs.

The block ACK frame control field may include identification information (MAC address, AID or PAID, and so on) corresponding to each of the multiple target STAs, information on the block ACK frame transmission resource corresponding to each of the multiple target STAs, and information on the transmission policy of the block ACK frame corresponding to each of the target STAs.

Scheduling information 1100 may correspond to information including information being included in the block ACK frame control field and information on the allocation resource (or subband) for the reception of the downlink data of each of the multiple target STAs.

More specifically, the AP may transmit a downlink PPDU (or downlink frame) including the scheduling information 110 to each of the multiple target STAs.

The AP may respectively transmit a downlink PPDU including downlink data1 1110, downlink data2 1120, downlink data3 1130, downlink data4 1140, and downlink data5 1150 corresponding to STA1, STA2, STA3, STA4, and STA5to STA1, STA2, STA3, STA4, and STA5through the first channel (primary channel), the second channel (secondary channel), the third channel (tertiary channel), and the fourth channel (quaternary channel) based on DL MU OFDMA (or DL MU MIMO).

The downlink PPDU may include the scheduling information 1100, and the scheduling information 1100 may include identification information corresponding to each of STA1, STA2, STA3, STA4, and STA5, information on the block ACK frame transmission resource (first channel) corresponding to each of the multiple target STAs (STA1, STA2, STA3, STA4, and STA5), and information on the transmission policy (STA1 (immediate block ACK), STA2 (delayed block ACK), STA3 (delayed block ACK), STA4 (delayed block ACK), and STA5 (delayed block ACK)) of the block ACK frame corresponding to each of the multiple target STAs.

Additionally, the scheduling information 1100 may include information on the allocated resource (or subband) for the reception of the downlink data by each of STA1, STA2, STA3, STA4, and STA5. More specifically, the scheduling information may include information on a subband within the first channel for the transmission of downlink data1 1110 corresponding to STA1, information on a subband within the first channel for the transmission of downlink data2 1120 corresponding to STA2, information on a subband within the second channel for the transmission of downlink data3 1130 corresponding to STA3, information on a subband within the third channel for the transmission of downlink data4 1140 corresponding to STA4, and information on a subband within the third channel and the fourth channel for the transmission of downlink data5 1150 corresponding to STA5.

In case the transmission of the downlink data is performed by the AP based on the DL MU MIMO, the scheduling information 1100 may include information on a space-time stream (or spatial stream) for the reception of downlink data by each of STA1, STA2, STA3, STA4, and STA5.

Each of STA1, STA2, STA3, STA4, and STA5 may receive downlink data through an allocated downlink resource based on the scheduling information 1100 and may then transmit a block ACK frame through an allocated uplink resource.

STA1may receive downlink data1 1110, and, then, after a predetermined period of time (e.g., SIFS), STA1may transmit block ACK frame1 1155 to the AP through the first channel by using immediate ACK transmission based on the scheduling information 1100.

STA2, STA3, STA4, and STA5 may receive a BAR frame by using delayed block ACK transmission based on the scheduling information, and, then, after a predetermined period of time (e.g., SIFS), STA2, STA3, STA4, and STA5 may transmit a block ACK frame to the AP through the first channel.

As shown in FIG. 11, the AP may transmit BAR frame2 1160 for the reception of block ACK frame2 1165 from STA2, and, then, as a response to the received BAR frame2

1160, block ACK frame2 1165 may be transmitted to the AP. The AP may receive block ACK frame1 1155, and, then, after a predetermined period of time (e.g., SIFS), the AP may transmit BAR frame2 1160 through the first channel. By using the same method, the AP may respectively transmit BAR frame3 1170, BAR frame4 1180, and BAR frame5 1190 to each of STA3, STA4, and STA5, and, then, the AP may respectively receive block ACK frame3 1175, block ACK frame4 1185, and block ACK frame5 1195 from each of STA3, STA4, and STA5.

In case the block ACK frame transmission resource is fixed to the primary channel (first channel), the information on the block ACK frame transmission resource may not be included in the scheduling information (or block ACK frame control field).

Figure 12:
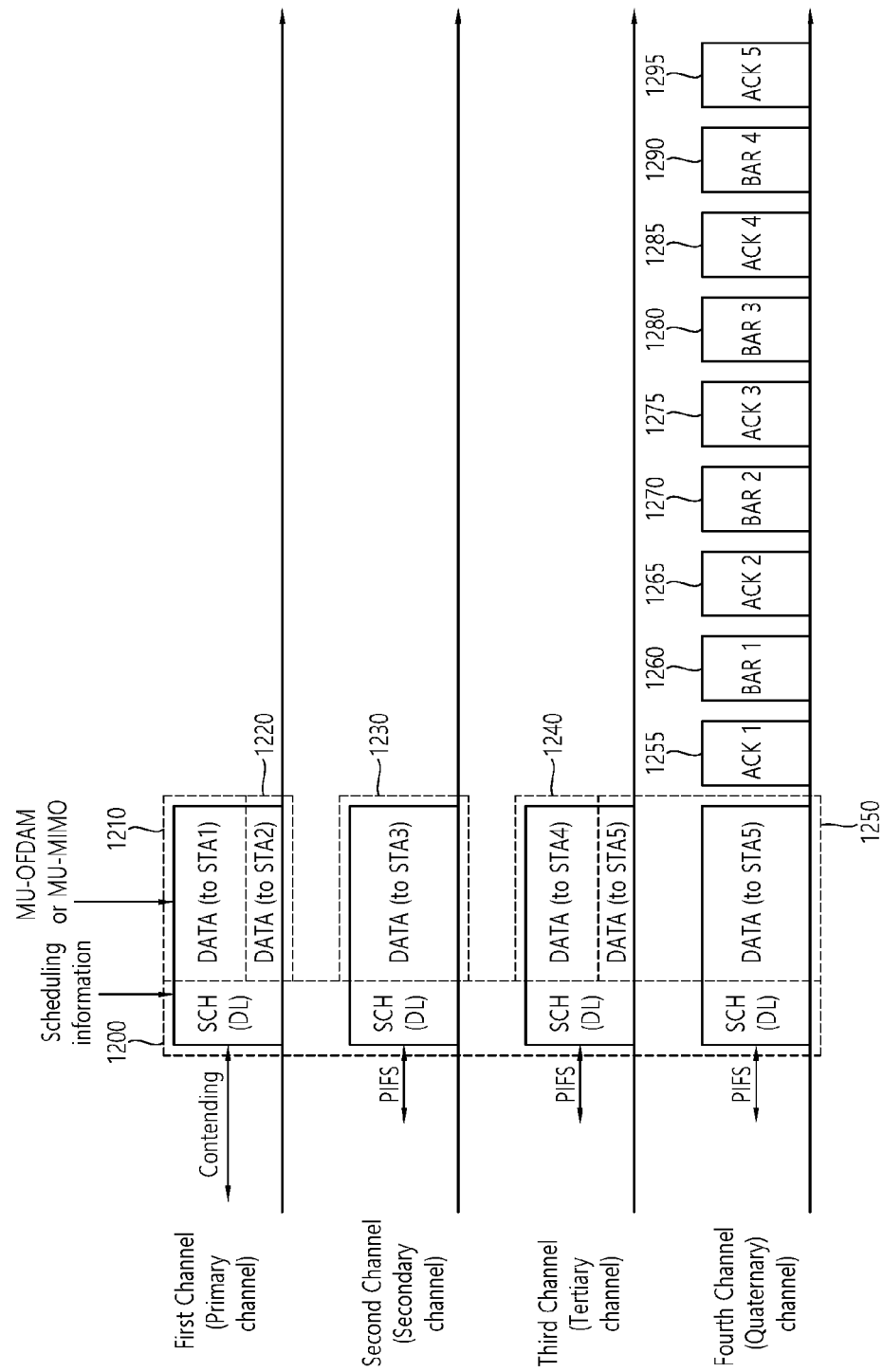
FIG. 12 is a conceptual diagram showing a method for transmitting a block ACK frame according to an exemplary embodiment of the present invention.

FIG. 12 is a conceptual diagram showing a method for transmitting a block ACK frame according to an exemplary embodiment of the present invention.

FIG. 12 discloses a method for transmitting a block ACK frame after the transmission of downlink data based on DL MU OFDMA performed by the AR Most particularly, disclosed herein is a case when the block ACK frames being transmitted by each of the entire target STAs are transmitted through a fourth channel.

Referring to FIG. 12, the downlink PPDU may include the scheduling information 1200, and the scheduling information 1200 may include identification information corresponding to each of STA1, STA2, STA3, STA4, and STA5, information on the block ACK frame transmission resource (fourth channel) corresponding to each of the multiple target STAs (STA1, STA2, STA3, STA4, and STA5), and information on the transmission policy (STA1(immediate block ACK), STA2 (delayed block ACK), STA3 (delayed block ACK), STA4 (delayed block ACK), and STA5 (delayed block ACK)) of the block ACK frame corresponding to each of the multiple target STAs.

STA1may receive downlink data1 1210, and, then, after a predetermined period of time (e.g., SIFS), STA1may transmit block ACK frame1 1255 to the AP through the fourth channel by using immediate ACK transmission based on the scheduling information 1200. The AP may receive block ACK frame1 1255, and, then, after a predetermined period of time (e.g., SIFS), the AP may transmit BAR frame2 1260 through the fourth channel. Each of STA2, STA3, STA4, and STA5 may respectively receive BAR frame2 1260, BAR frame3 1270, BAR frame4 1280, and BAR frame5 1290 by using delayed block ACK transmission based on the scheduling information, and, then, after a predetermined period of time (e.g., SIFS), each of STA2, STA3, STA4, and STA5 may respectively transmit block ACK frame2 1265, block ACK frame3 1275, block ACK frame4 1285, and block ACK frame5 1295 corresponding to each of downlink data2 1220, downlink data3 1230, downlink data4 1240, and downlink data5 1250 to the AP through the fourth channel.

Figure 13:
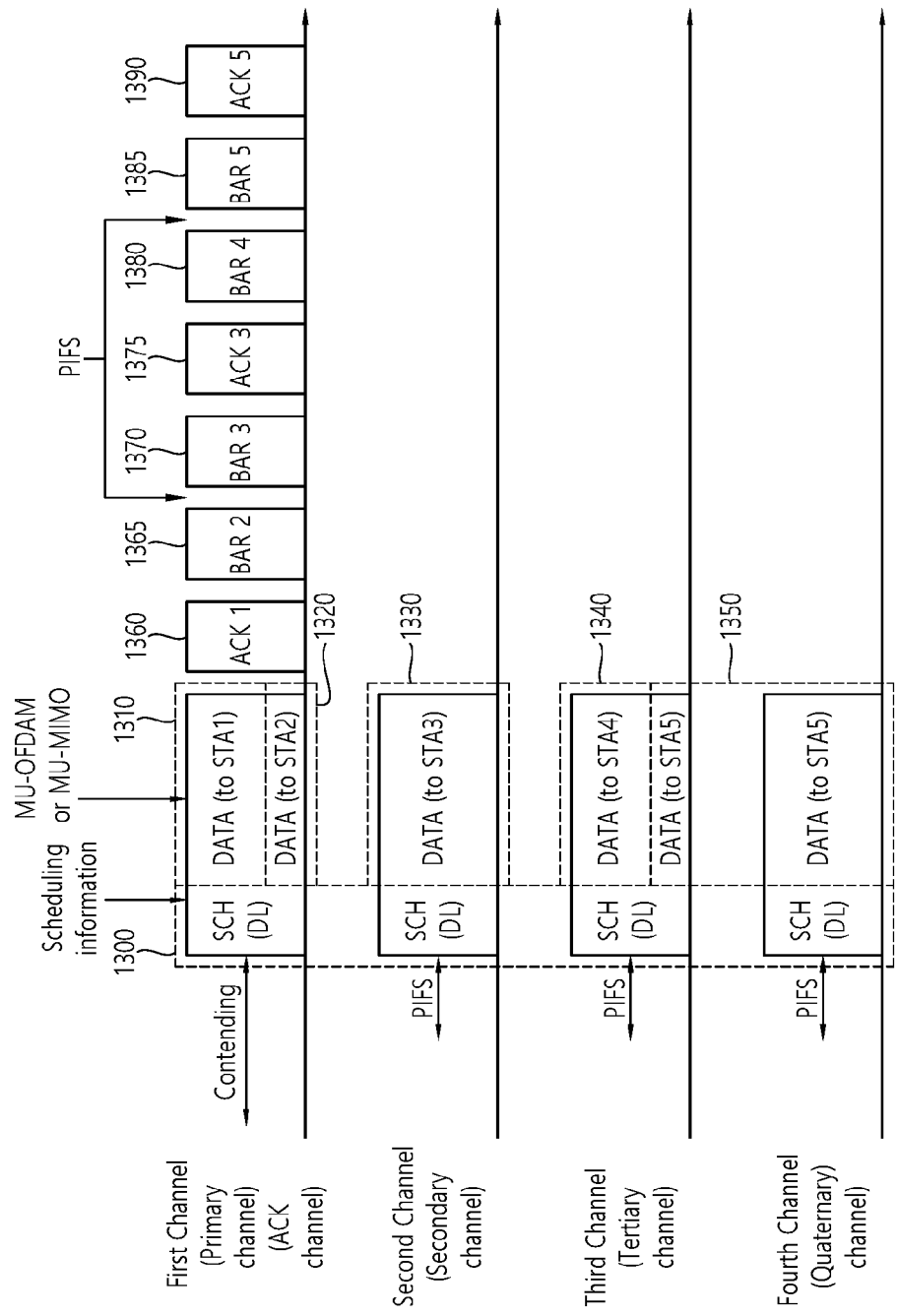
FIG. 13 is a conceptual diagram showing a transmission of a block ACK frame according to an exemplary embodiment of the present invention.

FIG. 13 is a conceptual diagram showing a transmission of a block ACK frame according to an exemplary embodiment of the present invention.

FIG. 13 discloses a method for transmitting a block ACK frame after the transmission of downlink data based on DL MU OFDMA performed by the AP. Most particularly, in case the block ACK frame has not been transmitted by a specific target STA, the block ACK frame transmission procedure of multiple target STAs is disclosed. In FIG. 13, disclosed herein is a transmission of block ACK frame within the first channel by each of the multiple target STAs based on the scheduling information 1300, as shown in FIG. 11.

STA1 receives indication on an immediate block ACK transmission based on the scheduling information, and, after receiving downlink data1 1310 corresponding to STA1, block ACK frame1 1360 may be transmitted to the AP.

The AP may receive the block ACK frame1 1360 from STA1, and, then, after a predetermined period of time (e.g., SIFS), the AP may transmit BAR frame2 1365 for receiving block ACK frame2 to STA2.

The AP may transmit BAR frame2 1365 to STA2 but may not receive block ACK frame2 from STA2 as a response to the received BAR frame2 1365. For example, STA2 may not receive BAR frame2, and STA2 may not transmit block ACK frame2 to the AP. The AP that has failed to receive block ACK frame2 may transmit BAR frame3 1370 to STA3 in order to receive block ACK frame3 1375 from STA3 after a predetermined period of time (e.g., PIFS) based on the transmission of the BAR frame2 1365.

More specifically, in case the AP fails to receive a block ACK frame before a threshold time (e.g., a time period after transmitting a BAR frame and after a SIFS), the AP may transmit another BAR frame after a predetermined period of time (e.g., PIFS) based on a previous transmission of the BAR frame.

As a response to BAR frame3 1370, the AP may receive block ACK frame3 1375 from STA3. STA3 may receive BAR frame3 1370 and, then, after a predetermined period of time (e.g., after SIFS), STA3 may transmit block ACK frame3 1370 to the AP.

The AP may receive block ACK frame3 1375 and may then transmit BAR frame4 1380 for receiving block ACK frame4 from STA4.

AP may not receive block ACK frame4 as a response to BAR frame4 1380, and, in case the AP fails to receive block ACK frame4 before a threshold time (e.g., after SIFS after transmitting BAR frame4), the AP may transmit BAR frame5 1385 after a predetermined period of time (e.g., PIFS) based on the transmission of BAR frame4, which was previously transmitted.

As a response to BAR frame5 1385, the AP may receive block ACK frame5 1390 from STA5.

In case the block ACK frame reception method shown in FIG. 11 to FIG. 13 is used, with the exception for the one channel, which is allocated as the block ACK frame transmission resource, the remaining channel may be used to perform communication between the STA and the AP within another BSS. Additionally, in case the reception of the block ACK frame based on the BAR frame has failed, by immediately transmitting another BAR frame for the reception of another block ACK frame after a predetermined period of time (e.g., PIFS), the channel access of non-target STAs (other STAs excluding the target STAs) may be restricted.

Figure 14:
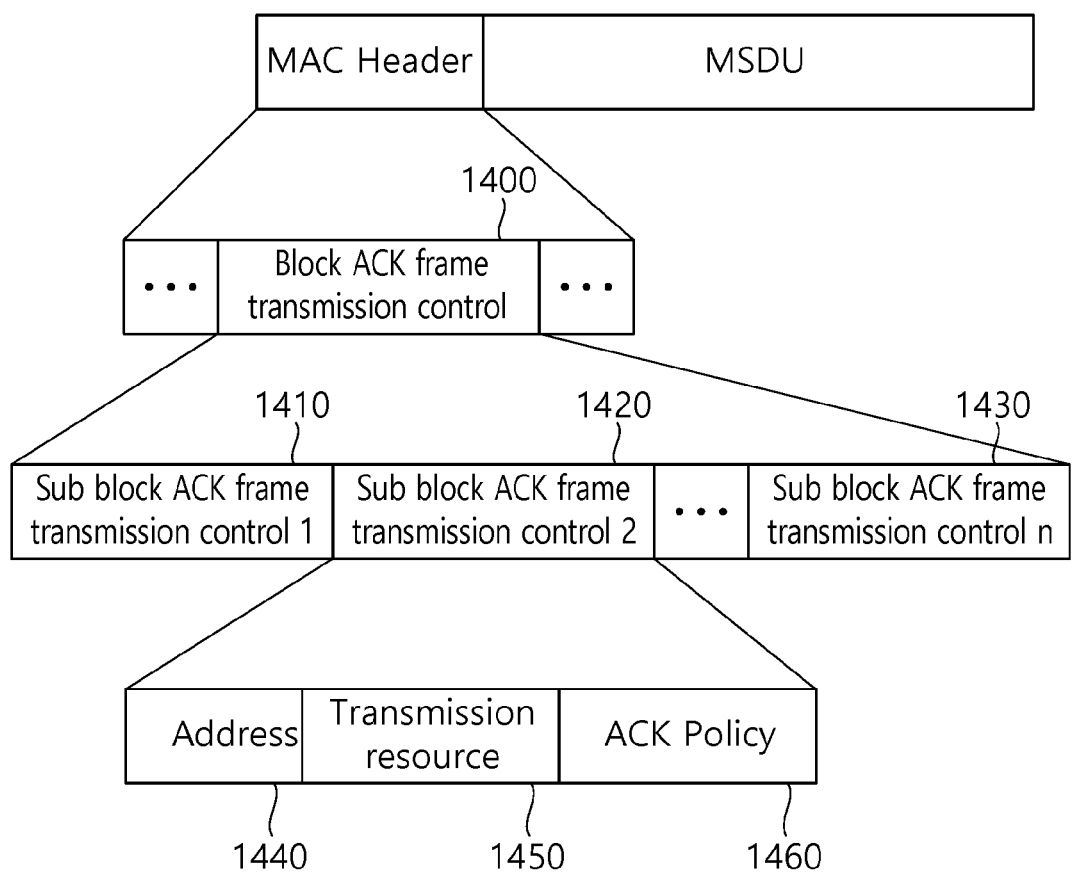
FIG. 14 is a conceptual diagram showing a frame structure including a block ACK frame transmission control field according to an exemplary embodiment of the present invention.

FIG. 14 is a conceptual diagram showing a frame structure including a block ACK frame transmission control field according to an exemplary embodiment of the present invention.

In FIG. 14, although a case when a block ACK frame transmission control field 1400 is included in the MAC header is assumed and described accordingly, the block ACK frame transmission control field 1400 may be included in the PPDU header or payload, and so on.

Referring to FIG. 14, the frame may include a MAC header and MSDU (payload), and the MAC header may include the block ACK frame transmission control field 1400.

The block ACK frame transmission control field 1400 may include identification information of each of the multiple target STAs, information on the block ACK frame transmission resource corresponding to each of the multiple target STAs, and transmission policy of the block ACK frame corresponding to each of the multiple target STAs.

The block ACK frame transmission control field 1400 may include a plurality of sub block ACK frame transmission fields 1410, 1420, and 1430, and each of the plurality of sub block ACK frame transmission fields 1410, 1420, and 1430 may include an address field 1440, a transmission resource field 1450, and an ACK policy field 1460.

The address field 1440 may include identification information (e.g., MAC address) of a specific target STA.

The transmission resource field 1450 may include information on a block ACK frame transmission resource corresponding to a specific target STA. More specifically, the transmission resource field may include information on a channel for transmitting a block ACK frame that is allocated to the specific target STA.

The ACK policy field 1460 may include information on a transmission policy of the block ACK frame corresponding to the specific target STA.

The number of sub block ACK frame transmission fields being included in the block ACK frame transmission field may be equal to the number of target STAs.

Figure 15:
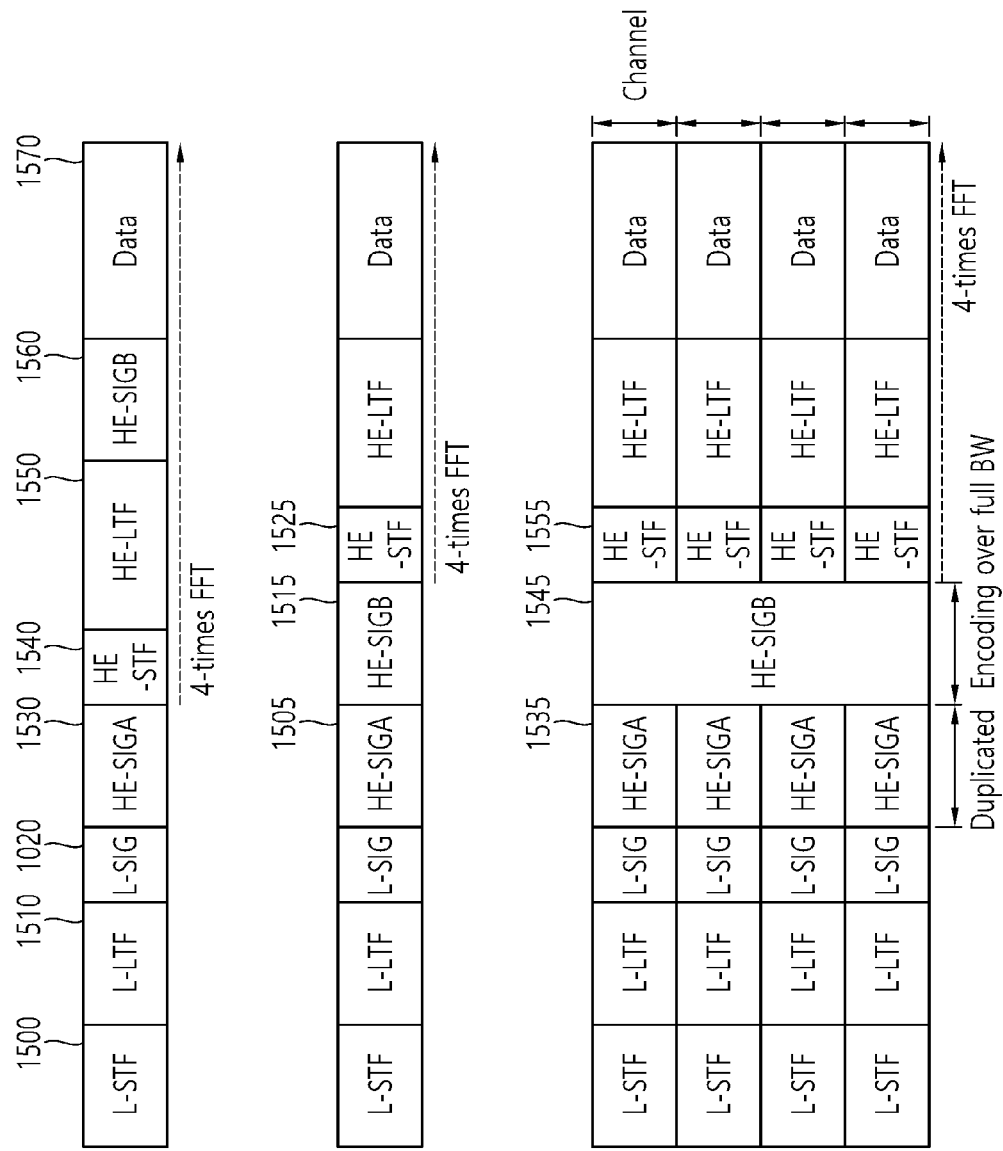
FIG. 15 is a conceptual diagram showing a PPDU format for transmitting a frame according to an exemplary embodiment of the present invention.

FIG. 15 is a conceptual diagram showing a PPDU format for transmitting a frame according to an exemplary embodiment of the present invention.

FIG. 15 discloses a PPDU format according to an exemplary embodiment of the present invention. Based on the PPDU format shown in FIG. 15, the above-described frames (e.g., downlink frame (or downlink data), BAR frame, block ACK frame, and so on) may be carried.

Referring to the upper part of FIG. 15, a PPDU header of a downlink PPDU may include a legacy-short training field (L-STF), a legacy-long training field (L-LTF), a legacy-signal (L-SIG), a high efficiency-signal A (HE-SIG A), a high efficiency-short training field (HE-STF), a high efficiency-long training field (HE-LTF), and a high efficiency-signal B (HE-SIG B). The PPDU may be divided into a legacy part, which consists of a part starting from the PHY header to the L-SIG, and a high efficiency (HE) part, which consists of a part after the L-SIG.

The L-STF 1500 may include a short training orthogonal frequency division multiplexing (OFDM) symbol. The L-STF 1500 may be used for frame detection, automatic gain control (AGC), diversity detection, and coarse frequency/time synchronization.

The L-LTF 1510 may include a long training orthogonal frequency division multiplexing (OFDM) symbol. The L-LTF 1510 may be used for fine frequency/time synchronization and channel prediction.

The L-SIG 1520 may be used for transmitting control information. The L-SIG 1520 may include information on data transmission rate, data length, and so on.

The HE-SIG A 1530 may also include information for indicating a STA (or AP) that is to receive the PPDU. For example, HE-SIG A 1530 may include an identifier of a specific STA that is to receive the PPDU and information for indicating a group of specific STAs. Additionally, in case the PPDU is transmitted based on OFDMA or MIMO, the HE-SIG A 1530 may also include allocation information corresponding to the downlink resource for the reception of the downlink data of the STA.

Additionally, the HE-SIG A 1530 may also include color bits information for BSS identification information, bandwidth information, tail bit, CRC bit, modulation and coding scheme (MCS) information on the HE-SIG B 1560, information on the number of symbols for the HE-SIG B 1560, and cyclic prefix (CP) (or guard interval (GI)) length information.

More specifically, the HE-SIG A 1530 may include information on the target STA that is to receive downlink data and information on the target STA allocated resource (or subband). The target STA may receive downlink data from the AP through the indicated target STA allocated resource (subband).

Additionally, the HE-SIG A 1530 may also include the above-described block ACK frame transmission control field. The HE-SIG A 1530 may include identification information corresponding to each of the multiple target STAs, information on the block ACK frame transmission resource corresponding to each of the multiple target STAs, and information on the transmission policy of the block ACK frame corresponding to each of the target STAs.

The HE-STF 1540 may be used for enhancing automatic gain control estimation in a multiple input multiple output (MIMO) environment or an OFDMA environment.

The HE-LTF 1550 may be used for estimating a channel in a MIMO environment or an OFDMA environment.

The HE-SIG B 1560 may include information on a length MCS of a physical layer service data unit (PSDU) for each STA and a tail bit, and so on. Additionally, the HE-SIG B 1560 may also include information on the STA that is to receive the PPDU and information on the resource allocation based on OFDMA (or MU-MIMO information). In case the resource allocation information based on OFDMA (or MU-MIMO related information) is included in the HE-SIG B 1560, the corresponding information may not be included in the HE-SIG A 1530.

The IFFT size being applied to the HE-STF 1540 and the field after the HE-STF 1540 may be different from the IFFT size being applied to the field before the HE-STF 1540. For example, the IFFT size being applied to the HE-STF 1540 and the field after the HE-STF 1540 may be four times larger than the IFFT size being applied to the field before the HE-STF 1540. The STA may receive the HE-SIG A 1530 and may receive an indication to receive a downlink PPDU based on the HE-SIG A 1530. In this case, the STA performs decoding based on the FFT size, which is changed starting from the HE-STF 1540 and the field after the HE-STF 1540. Conversely, in case the STA does not receive indication to receive the downlink PPDU based on the HE-SIG A 1530, the STA may stop the decoding process and may perform network allocation vector (NAV) configuration. A cyclic prefix (CP) of the HE-STF 1540 may have a size that is larger than the CP of other fields, and, during such CP period, the STA may change the FFT size and may perform decoding on the downlink PPDU.

The order of the fields configuring the format of the PPDU shown in the upper part of FIG. 15 may also be changed. For example, as shown in the middle part of FIG. 15, the HE-SIG B 1515 may be positioned immediately after the HE-SIG A 1505. The STA may perform decoding up to the HE-SIG A 1505 and the HE-SIG B 1515 and may receive the required control information and may then perform NAV configuration. Similarly, the IFFT size being applied to the HE-STF 1525 and the field after the HE-STF 1525 may be different from the IFFT size being applied to the field before the HE-STF 1525.

The STA may receive the HE-SIG A 1505 and the HE-SIG B 1515. In case the reception of the PPDU is indicated by the HE-SIG A 1505, the STA may change the FFT size starting from the HE-STF 1525 and may then perform decoding on the PPDU. Conversely, the STA may receive the HE-SIG A 1505, and, in case the reception of the downlink PPDU is not indicated based on the HE-SIG A 1505, the network allocation vector (NAV) configuration may be performed.

Referring to the lower part of FIG. 15, a PPDU format (DL MU PPDU format) for DL MU transmission is disclosed. The DL MU PPDU may be used for transmitting downlink data to multiple STAs through different transmission resources (frequency resources (channels, subbands)).

As described above, the AP may transmit downlink data corresponding to multiple target STAs through the first channel and may transmit downlink data corresponding to multiple target STAs through the second channel within an overlapped time resource. Each of downlink PPDU1 and downlink PPDU2 respectively delivering (or carrying) downlink data through the first channel and the second channel, may have a PPDU format for the DL MU transmission, which is shown in the lower part of FIG. 10. The HE-SIG A 1535 of downlink PPDU1 may include information on an identifier of the target STA that is to receive downlink data through the first channel and information on a target STA allocated subband. The HE-SIG A 1535 of downlink PPDU2 may include information on an identifier of the target STA that is to receive downlink data through the second channel and information on a target STA allocated subband.

Similarly, a DL MU PPDU, which is generated based on a single IFFT process within multiple channels (e.g., the first channel and the second channel) may transmit downlink data to multiple target STAs through multiple channels. The HE-SIG A 1535 of a PPDU header of a PPDU of the DL MU PPDU format, which is generated based on an single IFFT process within multiple channels, may include information on a target STA that is to receive downlink data within multiple channels and information on a subband that is allocated to the target STAs, among the subbands being included in the multiple channels.

Within the PPDU, the fields before the HE-SIG B 1545 may each be transmitted from different transmission resources in duplicated forms. The HE-SIG B 1545 may be transmitted in an encoded form over the entire transmission resources. Alternatively, the HE-SIG B 1545 may be encoded in the same unit (e.g., 20 MHz) as the legacy part and may be duplicated in 20 MHz units within the entire transmission resource and may then be transmitted. Although the HE-SIG B 1545 may be encoded in the same unit (e.g., 20 MHz) as the legacy part, the HE-SIG B 1545 that is being transmitted through each of the multiple 20 MHz units, which are included in the entire transmission resource, may also include different sets of information.

The fields after the HE-SIG B 1545 may include individual information for each of the multiple STAs receiving the PPDU.

In case each of the fields included in the PPDU is transmitted through each transmission resource, the CRC for each field may be included in the PPDU. Conversely, in case a specific field included in the PPDU is encoded and transmitted over the entire transmission resource, the CRC for each field may not be included in the PPDU. Therefore, the overhead for the CRC may be reduced.

Similarly, in the PPDU format for the DL MU transmission, the HE-STF 1555 and the field after the HE-STF 1555 may also be encoded based on an IFFT size that is different from the field before the HE-STF 1555. Therefore, in case the STA receives the HE-SIG A 1535 and the HE-SIG B 1545 and receives an indication on the reception of the PPDU based on the HE-SIG A 1535, the STA may change the FFT size starting from the HE-STF 1555 and may then perform decoding on the PPDU.

Figure 16:
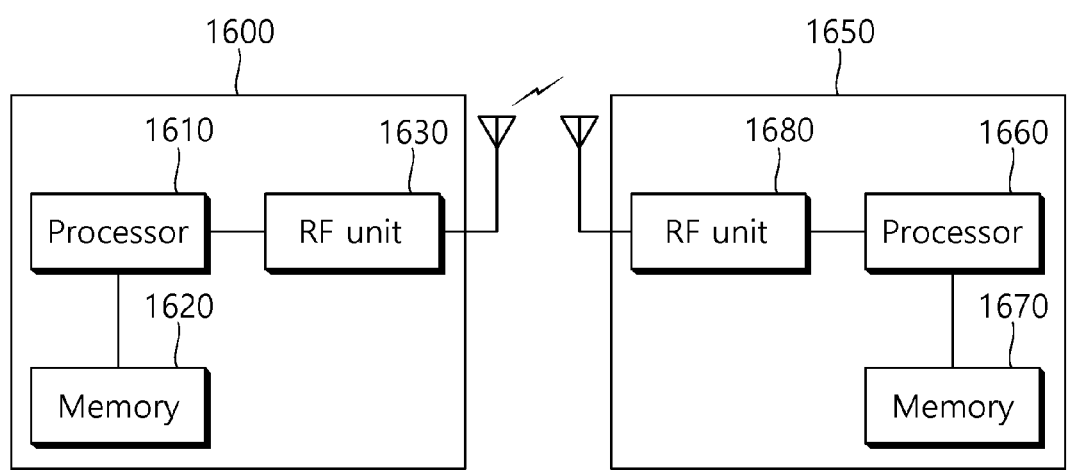
FIG. 16 is a block diagram showing a wireless device to which the exemplary embodiment of the present invention can be applied.

FIG. 16 is a block diagram showing a wireless device to which the exemplary embodiment of the present invention can be applied.

Referring to FIG. 16, as an STA that can implement the above-described exemplary embodiment, the wireless device 1600 may correspond to an AP 1600 or a non-AP station (STA) 1650.

The AP 1600 includes a processor 1610, a memory 1620, and a radio frequency (RF) unit 1630.

The RF unit 1630 is connected to the processor 1610, thereby being capable of transmitting and/or receiving radio signals.

The processor 1610 implements the functions, processes, and/or methods proposed in the present invention. For example, the processor 1610 may be implemented to perform the operations of the AP according to the above-described exemplary embodiments of the present invention. The processor may perform the operations of the AP, which are disclosed in the exemplary embodiments of FIG. 1 to FIG. 15.

For example, the processor 1610 may be implemented to transmit a downlink physical layer protocol data unit (PPDU) including downlink data corresponding to each of the multiple stations (STAs) to the multiple STAs through multiple channels and to receive multiple block ACK frames being transmitted from each of the multiple STAs based on the block ACK transmission control field. Each of the multiple block ACK frame may include ACK information corresponding to the downlink data, and the downlink PPDU may include the block ACK transmission control field, and the block ACK transmission control field may include a transmission resource field and an ACK policy field. The transmission resource field may include information on the channel for the transmission of each of the multiple block ACK frames by each of the multiple STAs, among the multiple channels, and the ACK policy field may include information on whether each of the multiple block ACK frame will be transmitted based on the immediate block ACK transmission or based on the delayed block ACK transmission by each of the multiple STAs.

Additionally, the processor 1610 may be implemented to receive an immediate block ACK frame from a first STA, which has received indication to perform immediate block ACK transmission based on the ACK policy field, among the multiple STAs, within at least one channel among the multiple channels, to transmit a block acknowledgement request (BAR) frame to a second STA, which has received indication to perform the delayed block ACK transmission based on the ACK policy field, among the multiple STAs, within at least one channel among the multiple channels, and to receive a delayed block ACK frame from the second STA as a response to the BAR frame. The multiple block ACK frames may include an immediate block ACK frame and a delayed block ACK frame, and the immediate block ACK frame may be transmitted within a predetermined period of time (e.g., SIFS) after the reception of the downlink PPDU of the first STA, and the delayed block ACK frame may be transmitted within a predetermined period of time (e.g., SIFS) after the reception of the BAR frame of the second STA.

Additionally, the processor 1610 may be implemented to transmit a first block acknowledgement request (BAR) frame to the first STA, which has received indication to perform delayed block ACK transmission based on the ACK policy field, among the multiple STAs, within at least one channel among the multiple channels, and, in case a first delayed block ACK frame cannot be received from the first STA as a response to the first BAR frame within a threshold time period, to transmit a second BAR frame to a second STA, which has received indication to perform delayed block ACK transmission based on the ACK policy field, among the multiple STAs, within at least one channel within a predetermined period of time. The threshold time period may be determined by considering the time for transmitting a first delayed block ACK frame after receiving the first BAR frame of the first STA.

The STA 1650 includes a processor 1660, a memory 1670, and a radio frequency (RF) unit 1680.

The RF unit 1680 is connected to the processor 1660, thereby being capable of transmitting and/or receiving radio signals.

The processor 1660 implements the functions, processes, and/or methods proposed in the present invention. For example, the processor 1660 may be implemented to perform the operations of the STA according to the above-described exemplary embodiments of the present invention. The processor may perform the operations of the STA, which are disclosed in the exemplary embodiments of FIG. 1 to FIG. 15.

For example, the processor 1660 may be implemented to receive a downlink PPDU (or downlink frame) including the block ACK transmission control field, and to transmit a block ACK frame by using the block ACK frame transmission policy, which is determined based on the ACK policy field included in the block ACK transmission control field within a specific block ACK transmission resource, which is determined based on the transmission resource field included in the block ACK transmission control field.

Additionally, the processor 1660 may be implemented to transmit a block ACK frame as a response to the BAR frame, in case the indication on the transmission resource for the transmission of the block ACK frame and the transmission policy of the block ACK frame is not received.

The processor 1610 and 1660 may include an application-specific integrated circuit (ASIC), another chip set, a logical circuit, a data processing device, and/or a converter converting a baseband signal and a radio signal to and from one another. The memory 1620 and 1670 may include a read-only memory (ROM), a random access memory (RAM), a flash memory, a memory card, a storage medium, and/or another storage device. The RF unit 1630 and 1680 may include one or more antennas transmitting and/or receiving radio signals.

When the exemplary embodiment is implemented as software, the above-described method may be implemented as a module (process, function, and so on) performing the above-described functions. The module may be stored in the memory 1620 and 1670 and may be executed by the processor 1610 and 1660. The memory 1620 and 1670 may be located inside or outside of the processor 1610 and 1660 and may be connected to the processor 1610 and 1660 through a diversity of well-known means.

What is claimed is:

1. A method for receiving a frame in a wireless local area network (WLAN), the method comprising:
    transmitting, by an access point (AP), a plurality of downlink physical layer protocol data units (DL PPDUs) including a plurality of downlink data for a plurality of stations (STAs) to the plurality of STAs based on orthogonal frequency division multiple access (OFDMA),
    wherein the plurality of DL PPDUs are transmitted based on a plurality of first subbands on a primary channel and a plurality of second subbands on a secondary channel,
    wherein the plurality of DL PPDUs include a plurality of block acknowledgement (ACK) transmission control fields for the plurality of STAs,
    wherein each of the plurality of block ACK transmission control fields includes a transmission resource field and an ACK policy field,
    wherein the transmission resource field includes information on whether an uplink channel allocated for a block ACK frame to be transmitted by a corresponding STA is the primary channel or the secondary channel, and
    wherein the ACK policy field includes information on whether the block ACK frame to be transmitted by the corresponding STA is set to an immediate block ACK transmission policy or a delayed block ACK transmission policy; and
    receiving, by the AP, from the plurality of STAs a plurality of block ACK frames that are transmitted based on the plurality of block ACK transmission control fields, wherein each of the plurality of block ACK frames includes ACK information for the plurality of downlink data.

2. The method of claim 1, wherein the uplink channel is fixed to one channel among the primary channel and the secondary channel.

3. The method of claim 1, wherein the step of receiving the plurality of block ACK frames comprises:
    receiving, by the AP, an immediate block ACK frame from a first STA, the first STA having received an indication for the immediate block ACK transmission policy based on the ACK policy field, among the plurality of STAs;
    transmitting, by the AP, a block acknowledgement request (BAR) frame to a second STA, the second STA having received an indication for the delayed block ACK transmission policy based on the ACK policy field, among the plurality of STAs; and
    receiving, by the AP, a delayed block ACK frame from the second STA as a response to the BAR frame,
    wherein the plurality of block ACK frames include the immediate block ACK frame and the delayed block ACK frame,
    wherein the immediate block ACK frame is transmitted within a predetermined period of time after a reception of at least one downlink PPDU for the first STA, and
    wherein the delayed block ACK frame is transmitted within the predetermined period of time after a reception of the BAR frame by the second STA.

4. The method of claim 1, wherein the step of receiving the plurality of block ACK frames comprises:
    transmitting, by the AP, a first block acknowledgement request (BAR) frame to a first STA, the first STA having received an indication for the delayed block ACK transmission policy based on the ACK policy field, among the plurality of STAs; and
    in case the AP fails to receive a first delayed block ACK frame from the first STA within a threshold time period as a response to the first BAR frame, transmitting, by the AP, a second BAR frame to a second STA, the second STA having received an indication for the delayed block ACK transmission policy based on the ACK policy field, among the plurality of STAs.

5. The method of claim 4, wherein the threshold time period is determined based on a time for transmitting a first delayed block ACK frame after receiving the first BAR frame of the first STA.

6. An access point (AP) for transmitting a frame in a wireless local area network (WLAN), the AP comprising:
a transceiver configured to transmit or receive radio signals; and
a processor operatively connected to the transceiver, wherein the processor is configured to:
control the transceiver to transmit a plurality of downlink physical layer protocol data units (DL PPDUs) including a plurality of downlink data for a plurality of stations (STAs) to the plurality of STAs based on orthogonal frequency division multiple access (OFDMA),
wherein the plurality of DL PPDUs are transmitted based on a plurality of first subbands on a primary channel and a plurality of second subbands on a secondary channel,
wherein the plurality of DL PPDUs include a plurality of block acknowledgement (ACK) transmission control fields for the plurality of STAs,
wherein each of the plurality of block ACK transmission control fields includes a transmission resource field and an ACK policy field,
wherein the transmission resource field includes information on whether an uplink channel allocated for a block ACK frame to be transmitted by a corresponding STA is the primary channel or the secondary channel, and
wherein the ACK policy field includes information on whether the block ACK frame to be transmitted by the corresponding STA is set to an immediate block ACK transmission policy or a delayed block ACK transmission policy, and
control the transceiver to receive from the plurality of STAs a plurality of block ACK frames that are transmitted based on the plurality of block ACK transmission control fields,
wherein each of the plurality of block ACK frames includes ACK information for the plurality of downlink data.

7. The AP of claim 6, wherein the uplink channel is fixed to one channel among the primary channel and the secondary channel.

8. The AP of claim 6, wherein the processor is further configured to:
control the transceiver to receive an immediate block ACK frame from a first STA, the first STA having received an indication for the immediate block ACK transmission policy based on the ACK policy field, among the plurality of STAs,
control the transceiver to transmit a block acknowledgement request (BAR) frame to a second STA, the second STA having received an indication for the delayed block ACK transmission policy based on the ACK policy field, among the plurality of STAs, and
control the transceiver to receive a delayed block ACK frame from the second STA as a response to the BAR frame,
wherein the plurality of block ACK frames include the immediate block ACK frame and the delayed block ACK frame,
wherein the immediate block ACK frame is transmitted within a predetermined period of time after a reception of at least one downlink PPDU for the first STA, and
wherein the delayed block ACK frame is transmitted within the predetermined period of time after a reception of the BAR frame by the second STA.

9. The method of claim 6, wherein the processor is further configured to:
control the transceiver to transmit a first block acknowledgement request (BAR) frame to a first STA, the first STA having received an indication for the delayed block ACK transmission policy based on the ACK policy field, among the plurality of STAs, and
in case the processor fails to receive a first delayed block ACK frame from the first STA within a threshold time period as a response to the first BAR frame, control the transceiver to transmit a second BAR frame to a second STA, the second STA having received an indication for the delayed block ACK transmission policy based on the ACK policy field, among the plurality of STAs.

10. The AP of claim 9, wherein the threshold time period is determined based on a time for transmitting a first delayed block ACK frame after receiving the first BAR frame of the first STA.

* * * * *